(12) United States Patent
Buerkle et al.

(10) Patent No.: US 11,529,951 B2
(45) Date of Patent: Dec. 20, 2022

(54) SAFETY SYSTEM, AUTOMATED DRIVING SYSTEM, AND METHODS THEREOF

(71) Applicant: Intel Corporation, Santa Clara, CA (US)

(72) Inventors: Cornelius Buerkle, Karlsruhe (DE); Fabian Oboril, Karlsruhe (DE); Ignacio Alvarez, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 230 days.

(21) Appl. No.: 16/726,281

(22) Filed: Dec. 24, 2019

(65) Prior Publication Data

US 2020/0130682 A1    Apr. 30, 2020

(51) Int. Cl.
| | |
|---|---|
| *B60W 30/095* | (2012.01) |
| *B60W 30/09* | (2012.01) |
| *G08G 1/16* | (2006.01) |
| *G08G 5/04* | (2006.01) |
| *G08G 3/02* | (2006.01) |

(52) U.S. Cl.
CPC ........ *B60W 30/0956* (2013.01); *B60W 30/09* (2013.01); *G08G 1/167* (2013.01); *B60W 2552/10* (2020.02); *B60W 2555/60* (2020.02); *G08G 3/02* (2013.01); *G08G 5/04* (2013.01)

(58) Field of Classification Search
CPC ............. B60W 30/09; B60W 2552/10; B60W 2555/60; B60W 2556/40; G08G 1/16; G08G 1/166; G08G 1/167; G08G 3/02; G08G 5/04
See application file for complete search history.

(56) References Cited

U.S. PATENT DOCUMENTS

| | | | |
|---|---|---|---|
| 2018/0148051 A1* | 5/2018 | Lujan | G05D 1/0214 |
| 2019/0213886 A1* | 7/2019 | Noda | G01C 21/26 |
| 2020/0086855 A1* | 3/2020 | Packer | G08G 1/161 |
| 2021/0053558 A1* | 2/2021 | Costa | B60W 30/09 |

(Continued)

OTHER PUBLICATIONS

Shalev-Shwartz, S. et al.; "On a Formal Model of Safe and Scalable Self-driving Cars"; 37 pages; dated 2017; Mobileye; retrieved from https://arxiv.org/pdf/1708.06374.pdf.

(Continued)

*Primary Examiner* — Anshul Sood
(74) *Attorney, Agent, or Firm* — Viering, Jentschura & Partner mbB

(57) ABSTRACT

In some aspects, a safety system may be configured to receive vehicle position data indicating a position of a vehicle, determine a first lane segment in a lane coordinate system based on the vehicle position data, the first lane segment being a lane segment in which the vehicle is located, determine a relevant set of lane segments based on a safety-range from the first lane segment, determine or receive obstacle position data indicating a second lane segment in the lane coordinate system, the second lane segment being a lane segment in which an obstacle is located, and classify the obstacle either as a non-relevant obstacle in the case that the second lane segment is not included in the relevant set of lane segments, or as a relevant obstacle in the case that the second lane segment is included in the relevant set of lane segments.

21 Claims, 16 Drawing Sheets

(56) References Cited

U.S. PATENT DOCUMENTS

2022/0017084 A1* 1/2022 Hausleitner ........... B60W 50/14

OTHER PUBLICATIONS

Bender, p et al.; "Lanelets: Efficient Map Representation for Autonomous Driving"; IEEE Intelligent Vehicles Symposium (IV); Jun. 2014; pp. 420-425; Dearborn, Michigan, USA.

Haklay, M et al.; "OpenStreetMap: User-Gemerated Street Maps"; IEEE Pervasive Computing; 2008; pp. 12-18.

Dupuis, M et al.; "OpenDRIVE 2010 and Beyond - Status and Future of the de facto Standard for the Description of Road Networks"; Proceedings of the Driving Simulation Conference Europe; 2010; pp. 231-242.

3Assmann, B et al.; "Towards Standardization of AV Safety: C++ Library for Responsibility Sensitive Safety"; IEEE ntelligent Vehicles Symposium (IV); Jun. 2019; pp. 2265-2271; Paris, France.

\* cited by examiner

FIG. 1A
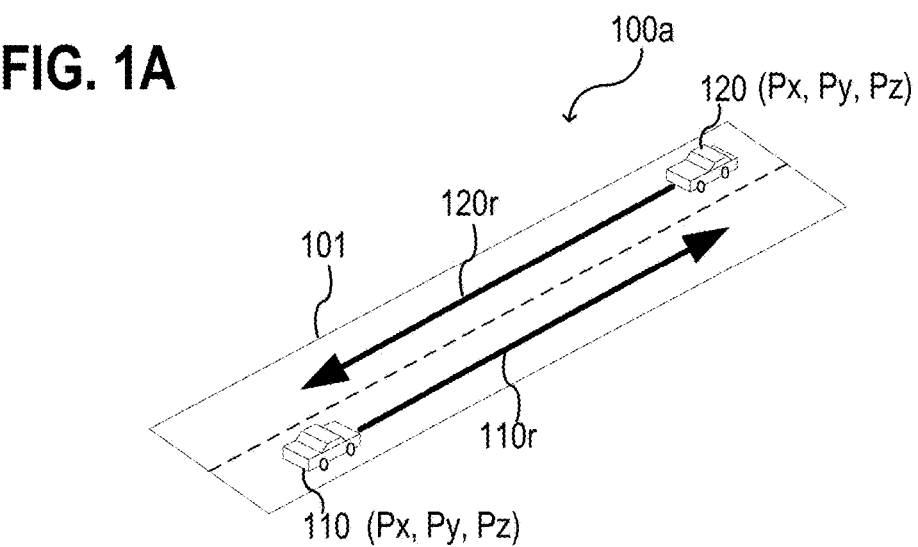
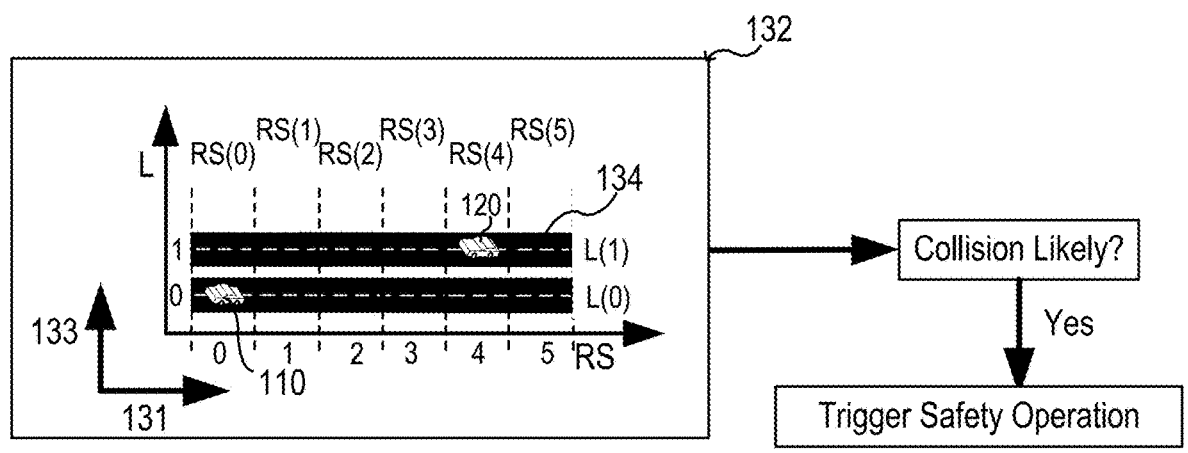

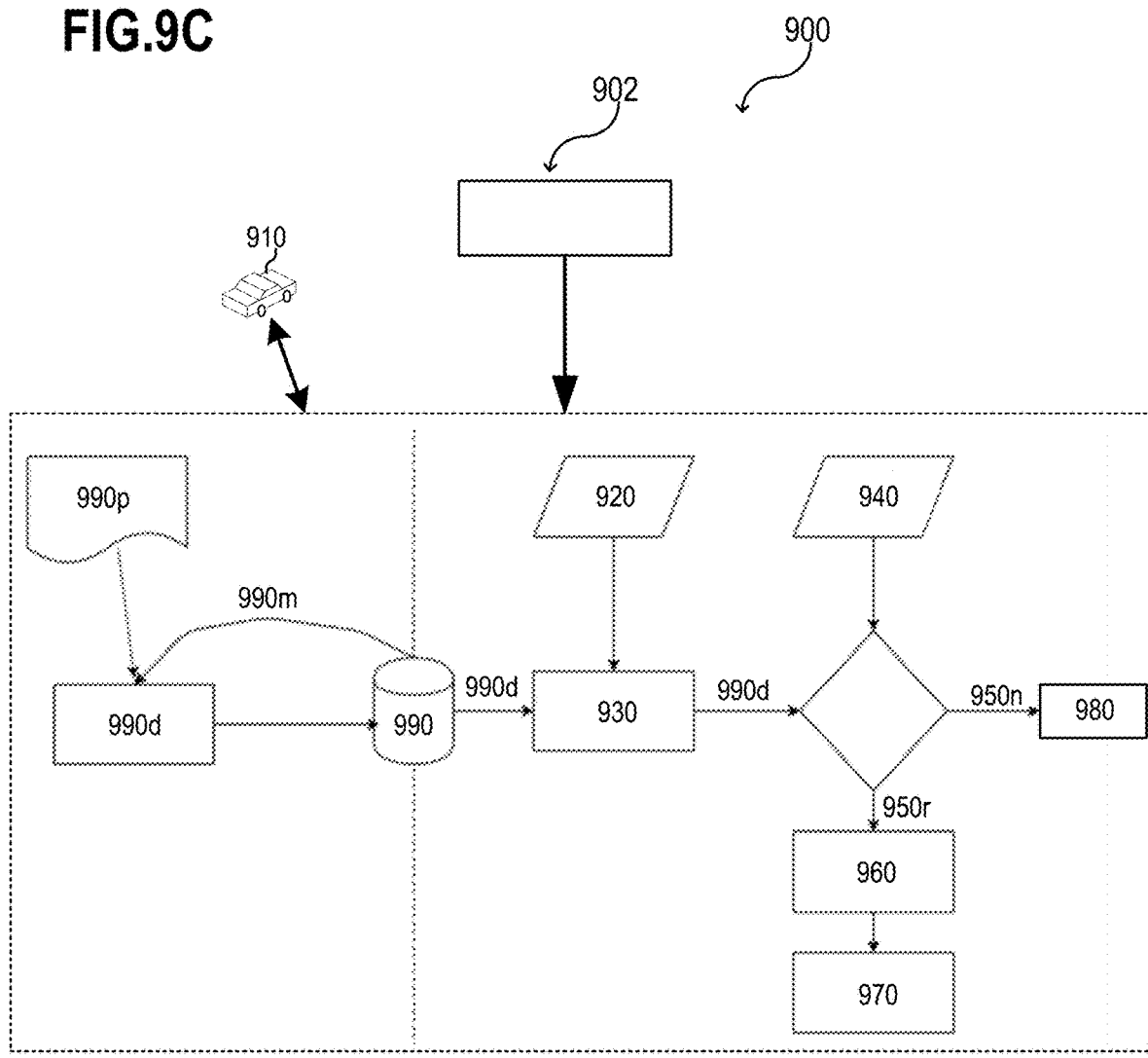

US 11,529,951 B2

SAFETY SYSTEM, AUTOMATED DRIVING SYSTEM, AND METHODS THEREOF

TECHNICAL FIELD

Various aspects relate generally to a safety system, an automated driving system, and methods thereof, e.g., a collision avoidance method.

BACKGROUND

In general, modern vehicles may include various active and passive assistance systems to assist during driving of the vehicle. As an example, an automated driving system (ADS) may be implemented in a vehicle. The automated driving system may be also referred to as an autonomous driving system, autopilot, self-driving system, or the like. As the complexity associated with automated driving systems increases, the burden on computational resources of the vehicle also increases.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 1A shows an exemplary traffic situation and possible routes that may be considered to determine a possible risk for a collision, according to some aspects;

FIG. 9A to FIG. 9C show various aspects of a safety system for use in a vehicle;

DESCRIPTION

Figure 1B:
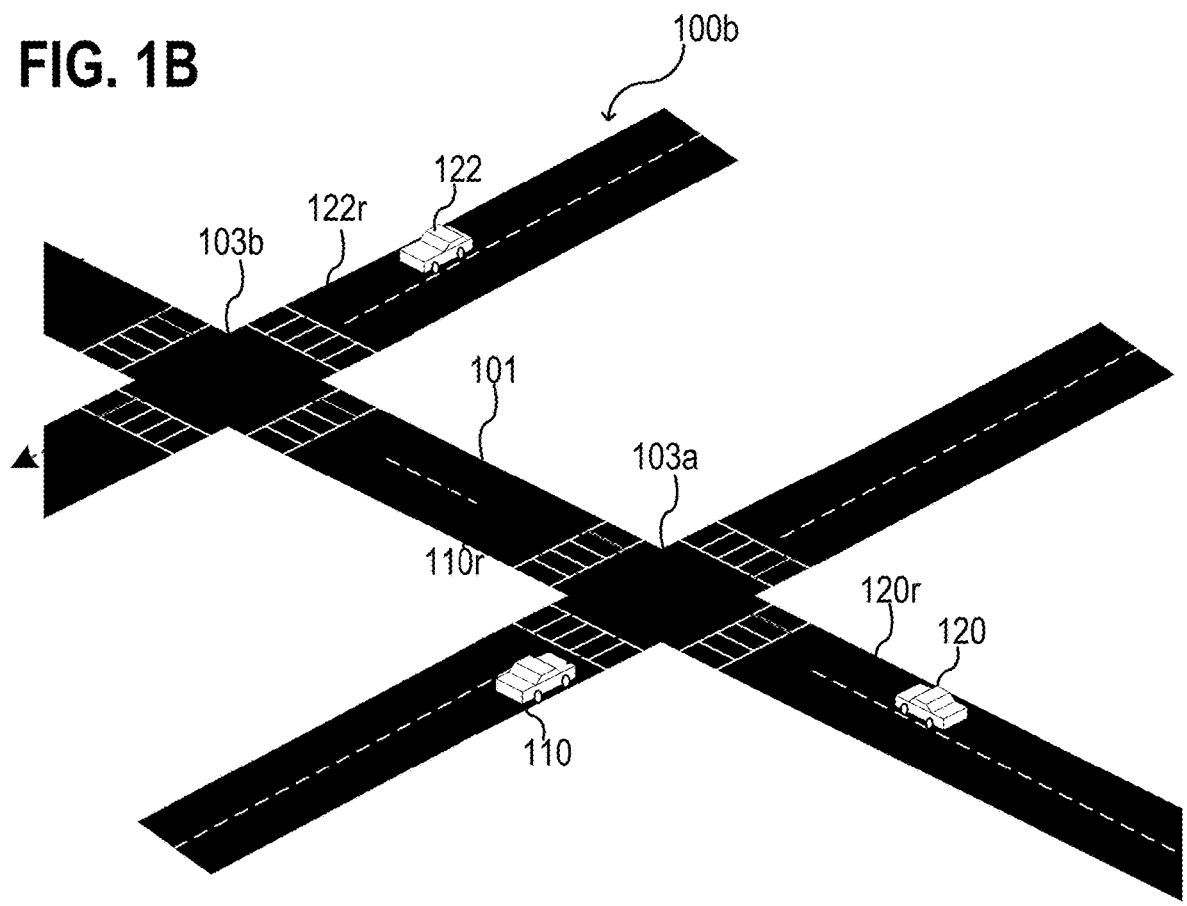
FIG. 1B shows an exemplary traffic situation and possible routes that may be considered to determine a possible risk for a collision, according to some aspects.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The term "processor" as, for example, used herein may be understood as any kind of entity that allows handling data. The data may be handled according to one or more specific functions executed by the processor. Further, a processor as used herein may be understood as any kind of circuit, e.g., any kind of analog or digital circuit. The term "handle" or "handling" as, for example, used herein referring to data handling, file handling or request handling may be understood as any kind of operation, e.g., an I/O operation, and/or any kind of logic operation. A processor may thus be or include an analog circuit, digital circuit, mixed-signal circuit, logic circuit, microprocessor, controller, microcontroller, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor. It is understood that any two (or more) of the processors detailed herein may be realized as a single entity with equivalent functionality or the like, and conversely that any single processor detailed herein may be realized as two (or more) separate entities with equivalent functionality or the like.

Differences between software and hardware implemented data handling may blur. A processor, a safety system, a computing system, and/or other aspects detailed herein may be implemented in software, hardware and/or as hybrid implementation including software and hardware.

The term "system" (e.g., a computing system, an automated driving system, a safety system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

As used herein, the term "memory", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

The term "vehicle" as used herein may be understood as any suitable type of vehicle, e.g., any type of ground vehicle, a watercraft, an aircraft, or any other type of vehicle. In some aspects, the vehicle may be a motor vehicle (also referred to as automotive vehicle). As an example, a vehicle may be a car also referred to as a motor car, a passenger car, etc. As another example, a vehicle may be a truck (also referred to as motor truck), a van, etc. As another example, a vehicle may be bicycle or a motorbike. In other aspects, the vehicle may be a partially or fully autonomously flying drone (e.g., an aeronautical taxi) having, for example, a pilot and/or one or more passengers onboard.

The term "lane" with the meaning of a "driving lane" as used herein may be understood as any type of transportation infrastructure (or section thereof) on which a vehicle may traverse. In a similar way, lanes may be associated with aeronautic traffic, marine traffic, etc., as well. The term "road" with the meaning of a "traffic road" as used herein may be understood as any type of transportation infrastructure (or section thereof) on which a vehicle may traverse. In a similar way, roads may be associated with aeronautic traffic, marine traffic, etc., as well.

According to various aspects, information (e.g., road information, obstacle position information, select information, control information, etc.) may be handled (e.g., processed, analyzed, stored, etc.) in any suitable form, e.g., data may represent the information and may be handled via one or more processors or via a computing system including one or more processors.

A risk that may originate from an obstacle, e.g., a risk for a potential collision, may be treated in an analysis (as described herein) as a potential collision event assigned to the obstacle and a reference vehicle. The reference vehicle may be also referred to as an ego-vehicle. An ego-vehicle may be a vehicle that may include a safety system or that may include an automated driving system including a safety system. In general, an ego-vehicle may be a vehicle that may serve as reference in a lane-based coordinate system or lane-based map. The ego-vehicle or the perspective associated with the ego-vehicle may define, for example, reference driving directions, safety relevant lane segments in the surrounding of the ego-vehicle, routes towards obstacles, as examples.

In some aspects, one or more sensors may be used for sensing one or more objects that may be regarded as one or more obstacles in the vicinity of the one or more sensors to provide, for example, obstacle position information and/or other real world data. A range imaging sensor, for example, may allow range information (or in other words distance information or depth information) to be associated with an image, e.g., to provide a range image having range data associated with pixel data of the image. This allows, for example, a range image of the vicinity of a vehicle including range information about one or more objects depicted in the image to be provided. According to various aspects, position data associated with absolute positions of objects or positions of objects relative to a vehicle may be determined from sensor information.

In one or more aspects, a driving operation (such as, for example, any type of safety operation, e.g., a collision avoidance function, a safety distance keeping function, etc.) may be implemented via one or more on-board components of a vehicle, e.g., via an automated driving system. The one or more on-board components of the vehicle may include, for example, one or more sensors (e.g., one or more cameras, one or more radar sensors, one or more light detection and ranging (LIDAR) sensors, etc.), a computer system, etc., in order to detect obstacles (e.g., at least in front of the vehicle) and to trigger an obstacle avoidance function (e.g., braking, steering, etc.) to avoid a collision with a detected obstacle.

According to various aspects, a computing system may be used to implement one or more functions described herein. The computing system may include, for example, one or more processors and one or more memories, as an example. The computing system may be communicatively coupled to one or more sensors (e.g., of a vehicle) to obtain and analyze sensor data generated by the one or more sensors, or the computing system may be coupled to, or may include, a sensor module that obtains and analyzes sensor data generated by one or more sensors.

Several aspects are described herein exemplarily with reference to a motor vehicle, whereas one or more other motor vehicles may, for example, represent one or more obstacles in a vicinity of the motor vehicle. However, other types of vehicles may be provided including the same or similar structures and functions as described exemplarily for the motor vehicle. Further, other obstacles may be considered in a similar way as described herein with reference to the one or more other motor vehicles. In some aspects, other types of obstacles than motor vehicles are to be considered. In other aspects, other types of obstacles may be considered in the case that the motor vehicle is another type of vehicle.

According to various aspects, a safety system may be provided that increases safety during operation of an automated driving system or any other suitable autonomous or partially autonomous system. This may, in part, increase society's trust of automated driving systems. In general, a need for safety assurances in automated driving may become increasingly critical with the accelerating widespread deployment of automated vehicle fleets. Beyond functional safety, it may be desired to guarantee the operational safety of these vehicles. To that end, a safety driving model may be introduced including a model-based approach to safety. Various aspects of the present disclosure may be related to a safety driving model Open Library, i.e., an open source executable implementation of a safety driving model. In some aspects, the safety driving model Open Library may be integrated with automated driving software pipelines as a safety module overseeing decision making of driving policies. As an example, the safety driving model may be integrated with a software platform to provide safety validation.

In general, advanced automated driving systems with capabilities, for example, beyond level 3 (L3+) may require significant investments in operational safety, in particular in the areas of scenario development and formal verification, testing and validation tools. Level 3 may be referred to as a level of driving automation in which a driver can safely turn his attention away from driving tasks, e.g., the driver can send a message via a communications system, watch a movie, or the like, and wherein the vehicle may handle situations that call for an immediate response, like emergency braking. However, in a level 3 driving automation, a driver has to be prepared to intervene within some limited time upon notification. A safety driving model may include a technology neutral model for safety that can be used to define and measure whether an automated vehicle is driving safely. A safety driving model may, in part, formalize an interpretation of a definition of what it means to drive safely, and may define what it means for an automated vehicle to drive safely on its own and how it should exercise reasonable caution to protect against the unsafe driving behavior of others.

Various aspects described herein may be related to a reduction of computational complexity of safety driving model checks or other safety checks in, for example, crowded or otherwise complex driving environments. Achieving safety for an autonomous system may be a big challenge nowadays. As described above, a safety checker may be used in combination with an autonomous system, e.g., a safety driving model. A safety driving model or other technologies may continuously check whether the vehicle (e.g., the ego-vehicle) is in a safe state. As an example, it may be continuously checked whether the vehicle is not in danger to cause an accident with other road participants. To determine whether the vehicle is in a safe state it may be helpful to check if a correlation with all relevant obstacles (e.g., other vehicle, etc.) in the environment of the vehicle is safe.

However, to check if a correlation with all relevant obstacles in the environment of the vehicle is safe, it was suggested to determine all possible routes that the relevant obstacles can follow, and to check whether these possible routes intersect with the planned route or all possible routes of the ego-vehicle.

In the following, the increasing complexity of determining all possible routes and intersects between two or more objects are illustrated based on two exemplary traffic situations. The determination may be performed with the help of a lane-based map or, in other words, in a lane-based coordinate system. However, the coordinate system may be only regarded as an example that allows for an efficient determination. In other aspects, other coordinate systems or other maps may be used in a same or in a similar way.

FIG. 1A and FIG. 1B show two exemplary traffic situations 100*a*, 100*b* and possible routes that may be considered in a determination of a possible risk for a collision between an ego-vehicle 110 and one or more obstacles. The one or more obstacles may include another vehicle 120 (or another object) that may be regarded as an obstacle for the ego-vehicle 110. As illustrated herein, the obstacle may, in some aspects, be the other vehicle 120 driving on the road, e.g., in an opposing direction. However, the obstacle may be a pedestrian, a cyclist, a construction side, or any other static or movable obstacle that is relevant for safety aspects in traffic.

As shown in FIG. 1A, the ego-vehicle 110 may drive along a first route 110*r* on a road 101. The first route 110*r* may be planned via an automated driving system associated with the ego-vehicle 110. The other vehicle 120 may drive, e.g., on a different lane, along a possible second route 120*r* on the road 101. From the perspective of the ego-vehicle 110, the actual route that the other vehicle may take may be unknown. A position of an object, e.g., the ego-vehicle 110 and/or the other vehicle 120, may be defined in two-dimensional Cartesian coordinates (Px, Py) or, where appropriate, in three-dimensional Cartesian coordinates (Px, Py, Pz) with reference to the real world. However, according to various aspects, it may be of advantage to switch from a Cartesian space into a road/lane-based coordinate system for calculating (e.g., safety) distances between vehicles.

To evaluate whether the ego-vehicle 110 is in a safe state or to evaluate a possible risk for a collision with the other vehicle 120, the traffic situation 100*a* may be evaluated in a lane-based coordinate system 132. In a lane-based coordinate system 132, each road may be described by a plurality of lane segments 134 arranged along the lateral direction and the longitudinal direction. Intersections and other structures, where more than one road has to be considered, may be handled via respective arrangements of one or more lane segments and/or one or more driving rules associated with the intersections and the respective other structure.

The lane-based coordinate system 132 may include, for example, a plurality of lane segments 134. In the lane-based coordinate system 132, one or more first sets of lane segments may represent one or more lanes L(0), L(1) of the respective road. Each of the one or more lanes L(0), L(1) may include lane segments 134 arranged along a first (e.g., longitudinal) direction 131. Further, in the lane-based coordinate system 132, second sets of lane segments 134 may represent road segments RS(0), RS(1), RS(2), RS(3), RS(4), RS(5) of the respective road. Each of the road segments RS(0), RS(1), RS(2), RS(3), RS(4), RS(5) may include lane segments 134 arranged along a second (e.g., lateral) direction 133. It is noted, that exemplarily a road with two lanes L and six road segments RS is illustrated in FIG. 1A; however, a road may include more or less than three lanes L and more or less than six road segments RS.

As an example, the road illustrated in the lane-based coordinate system 132 in FIG. 1A may include two times six lane segments 134. Each lane segment 134 may be identified by the number of a corresponding road segment RS and a number of a corresponding lane L as a tuple (RS, L). As example, a first lane segment (0, 0) may correspond to road segment 0 and lane 0, a second lane segment (1, 0) may correspond to road segment 1 and lane 0, [ . . . ], a seventh lane segment (0, 1) may correspond to road segment 0 and lane 1, an eighth lane segment (1, 1) may correspond to road segment 1 and lane 1, [ . . . ], etc.

Instead of tuples, as exemplarily illustrated above, lane segments of a lane-based coordinate system or of at least a part of a lane-based map may be denoted by numbers. According to various aspects, each lane segment in a lane-based coordinate system or at least in a part of a lane-based map may be unambiguously assigned to a number, a tuple, or something similar. According to various aspects, a lane-based coordinate system may be associated with a single road of a road network. According to various aspects, a lane-based coordinate system may be associated with two or more roads of a road network. According to various aspects, a lane-based map may include one or more lane-based coordinate systems associated with two or more roads of a road network.

According to various aspects, length information and/or width information may be assigned to each of the lane segments 134 of the lane-based coordinate system 132. In a similar way, height information may, in some aspects, be assigned to each of the lane segments 134 of the lane-based coordinate system. The height information may represent a three-dimensional geometry of a road.

According to various aspects, a position of the obstacles, e.g., the other vehicle 120, relative to the ego-vehicle 110 may be determined in the lane-based coordinate system 132 based on position information. As exemplarily illustrated in FIG. 1A, the ego-vehicle 110 may have a position in the lane segment (0, 0) and the obstacle (e.g., the other vehicle 120 participating in traffic) may have a position in the lane segment (4, 1). According to various aspects, a potential collision event (e.g., a likelihood for a collision of the ego-vehicle 110 with the obstacle) may be determined based on the determined relative position of the obstacle. In the case that the potential collision event is determined (e.g., if a determined likelihood for a collision is at or above a threshold or within a threshold range), one or more safety operations may be triggered to avoid a potential collision.

In some aspects, automated driving vehicles may use road and lane markings to identify driving corridors (also referred to as lanes). Perception and localization of these lane boundaries, as well as dynamic and static obstacles in the environment may constitute a basis of a driving situation coordinate system. Automated driving vehicles may use road or lane-based coordinate systems to derive lateral and longitudinal safety distance calculations for planning their path and avoid driving infractions and collisions. In at least one aspect, certain approaches to road/lane-based coordinate systems in automated driving may include assumptions, such as considering driving corridors to follow certain rules (e.g., lane markings are parallel, follow constant curvature or keep constant width). Various aspects described herein may be related to a more accurate description of an observed real world situation between two vehicles (e.g., an ego-vehicle 110 and another vehicle 120) within a lane-based coordinate system for the application of one or more safety calculations (e.g., defined by a safety driving model).

One approach for mapping information for maneuver planning may be through the use of lanelets, which describe small or irreducibly small lane segments characterized by its left and right bounds. Lanelets may allow for composing of complex road situations and incorporating tactical information for maneuver generation, such as rule-compliant intersections. Another mapping approach may be, for example, via Open Street Map, a crowdsourced database promulgated by the OpenStreetMap Foundation, which provides free, geographic street maps. Open Street Map models the world with nodes, ways, and relations and is useful to represent topological information. Another map representation may be OpenDrive (also written as OpenDRIVE), which is managed by VIRES Simulationstechnologie GmbH and the OpenDRIVE community. OpenDrive is an open format specification to describe a road network's logic, and thus may provide a standardized road network file format. It may be useful to provide a common interface between driving simulators at a macroscopic (e.g., road topology) level. Such techniques may be successful at solving particular mapping problems and may provide a basis for high definition maps.

FIG. 1B shows a more complex traffic situation 100*b* than FIG. 1A, wherein the road 101 includes two intersections 103*a*, 103*b* and wherein two other vehicles 120, 122 are driving on the roads. In this case, the ego-vehicle 110 may drive along a possible first route 110*r* on a road 101. The first route 110*r* may be planned via an automated driving system associated with the ego-vehicle 110. A first other vehicle 120 may drive along a variety of possible second routes 120*r* on the road 101 and a second other vehicle 122 may drive along a variety of possible third routes 122*r* on the road 101. From the perspective of the ego-vehicle 110, the actual routes that the other two vehicles 120, 122 may take may be unknown.

To evaluate whether the ego-vehicle 110 is in a safe state or to evaluate the possible risk of a collision, the traffic situation 100*b* may be evaluated in a lane-based coordinate system 132 in a similar was described above. However, in the case that the possible routes (e.g., first route 110*r* and second routes 120*r* and/or first route 110*r* and third routes 122*r*) intersect, the distance between the ego-vehicle 110 and the respective obstacle, e.g., the other vehicles 120, 122, may be checked according to the known safety driving model rules. According to safety driving model rules, all possible routes may be calculated, which causes in general a large computational effort, particularly in the case that a plurality of obstacles and a plurality of intersections are considered. As shown, for example, in FIG. 1B, the number of different possible routes increases with every intersection 103*a*, 103*b* and with every obstacle that is considered.

According to various aspects, a map may be used to calculate a route. In the map, e.g., in a lane-based map, information about length and connection between all lane segments may be available. Because the route of the vehicles 120, 122 might be unknown, except the route of the ego-vehicle 110, e.g., under the assumption that the ego-vehicle will not leave its planned route 110*r*, all possible paths are to be considered during an evaluation of a potential collision risk in at least one aspect. This may include considering all adjacent lanes, even those lanes in opposite driving direction, and all successors of all the adjacent lanes. Therefore, in some aspects, calculations of these routes may be quite costly in terms of resource utilization, especially since these calculations may be performed for all obstacles in the environment of the ego-vehicle 110. In addition, it may be not sufficient to calculate the routes; the routes of the obstacles might also be checked to ascertain whether they intersect with the route of the ego-vehicle and to determine the relevant segments between these participants afterwards.

If the road network becomes more complex than just one straight road, the situation between two vehicles may be somewhat ambiguous, especially when considering the vehicles could take different routes through intersections. To increase the likelihood of safety, a worst-case scenario may, in some aspects, be considered and therefore all potential configurations are to be considered when performing the situation analysis. As a result, multiple situations may be considered between two vehicles at the same time. According to various aspects, one or more or all lane segments, which connect the two vehicles and which form the connecting route between the two vehicles may be calculated based on, for example, road network data, vehicle position information, etc.

Figure 2:
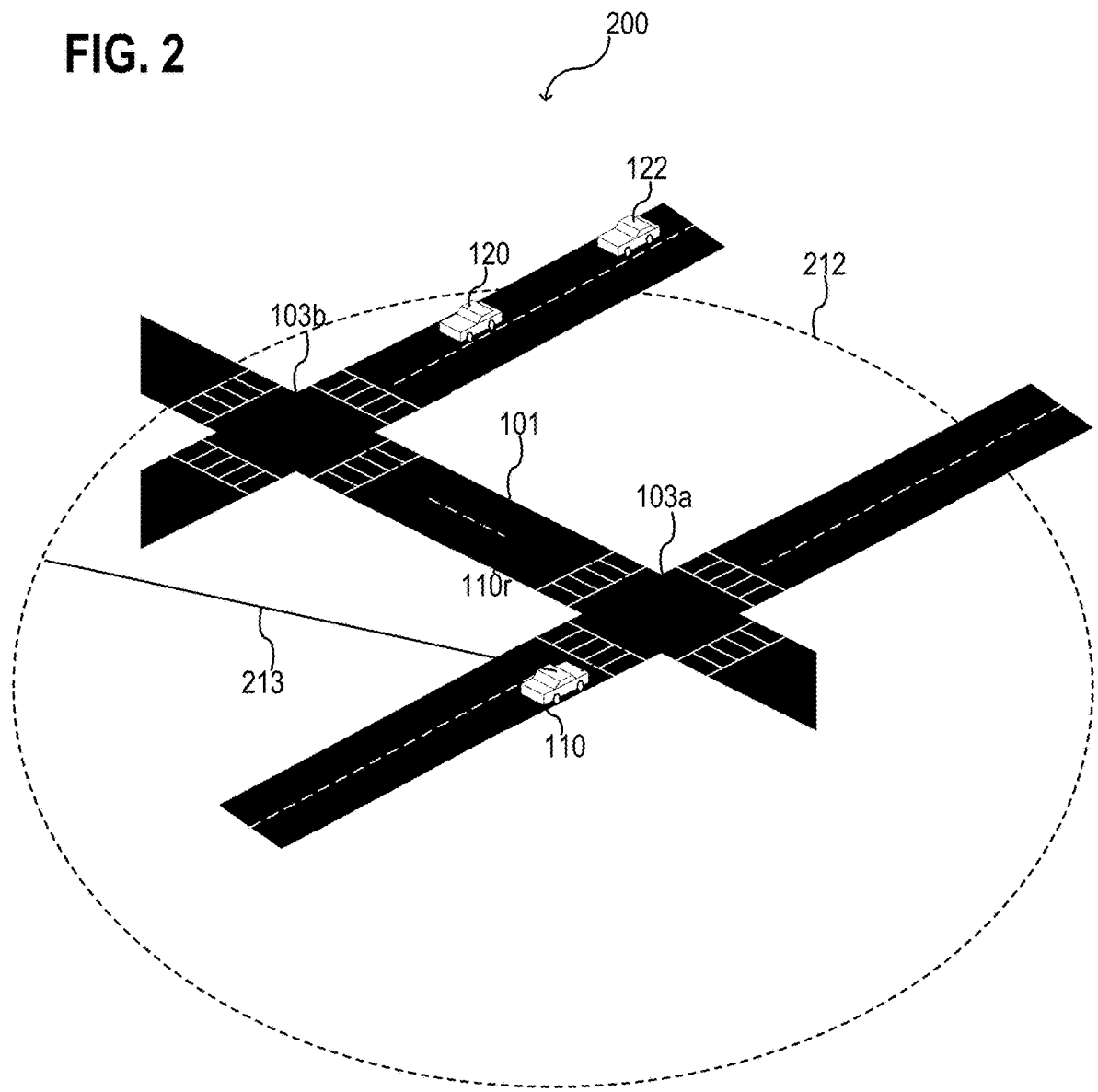
FIG. 2 shows a schematic diagram of an exemplary traffic situation and a possibility of distinguishing relevant from non-relevant obstacles, according to some aspects.

FIG. 2 shows a schematic diagram of an exemplary traffic situation 200, according to various aspects. In this exemplary traffic situation 200, an ego-vehicle 110, a first vehicle 120, and a second vehicle 122 are driving on one or more roads 101 connected via two intersections 103a, 103b. According to various aspects, relevance filtering may be used to discard all obstacles from safety considerations that are outside a relevant region 212. The relevant region 212 may be, for example, defined by one or more geometric shapes with respect to the ego-vehicle 110, e.g., a circle defined by a radius of several meters or tens of meters, around the ego-vehicle 110.

Based on one or more modeling rules (e.g., based on safety driving model rules), a maximum distance (also referred to as safety range) may, in some aspects, be defined with respect to the ego-vehicle 110 and another obstacle, e.g., between each of the two vehicles 120, 122. If the distance from the ego-vehicle to obstacle is greater than or equal to the maximum distance, the obstacle may be no longer a threat. As an example, the first vehicle 120 may be considered a potential threat and a safety check (e.g., based on a safety driving model) may be applied, since it may be located within the relevant region 212 associated with the ego-vehicle 110. However, the second vehicle 122 may not be considered a threat and no safety check (e.g., no safety driving model check) may be applied in this case, since the second vehicle 122 is located outside the relevant region 212 associated with the ego-vehicle 110. Reducing the number of threads has the propensity to result in a reduction of the number of possible routes to be calculated and, therefore, can reduce the computational effort. In some aspects, obstacles may be filtered based on a Euclidean distance 213 measured from the respective obstacle to the ego-vehicle 110.

However, this may have a limited effect in some applications, because a distance along a route within the road network may be longer than simply the Euclidean distance. Furthermore, it may be helpful to determine whether the obstacle and the ego-vehicle are travelling in the same direction or in opposite directions, which may have a substantive impact on the required safety distance there between. Hence, this approach may be, at least in some applications, not feasible and the computational effort to calculate routes between the vehicles may remain still too high for some computing devices to perform at a given frequency.

In the following, an approach is described that also allows for a reduction of the computational effort to perform safety assessments, e.g., to perform a safety driving model, efficiently. As an example, to promote safe behavior, safety driving model checks or other safety checks may be performed with a short latency and/or at least at the same frequency as the trajectory and the environment model may be updated (e.g., a frequency of at least 30 Hz). As a safety driving model or other safety systems may be targeted for mass production systems, the computational resources available for such safety checks might be limited in some applications. Therefore, expending computational power for "online" or "on the fly" route calculations for all obstacles may be not beneficial in some aspects.

In the following, an approach is described how a relevance of an obstacle for a safety operation, e.g., for a safety driving model check, can be efficiently determined and how the safety operation can be performed therefore more efficiently, e.g., with a reduced computational effort. Furthermore, an approach is described in the following how the route from the ego-vehicle towards an obstacle or from an obstacle towards the ego-vehicle may be efficiently determined, e.g., with a reduced computational effort.

In some aspects, one or more parts of a safety check, e.g., of a safety driving model check, may include a lane-based coordinate system (also referred to as lane-based map). The lane-based map may be constructed based on any suitable information of the corresponding road network, e.g., based on a high definition map. The lane-based map may include road segments and lane segments to describe a position of an ego-vehicle and of one or more obstacles therein. According to various aspects, all relevant lane segments to the ego-vehicle may be determined and, subsequently, it may be checked, whether obstacles are present in these relevant segments. This may allow, for example, the elimination of checking whether some of the routes of one or more obstacles and the ego-vehicle may intersect, which may involve complex calculations at least in some traffic situations. As a result, resource-intensive computational checks of intersecting routes may be no longer performed, because a route between the obstacles and the ego-vehicle may be known from information associated with the lane-based map, and paths may only be calculated once, if the results are stored in memory accordingly.

Figure 3:
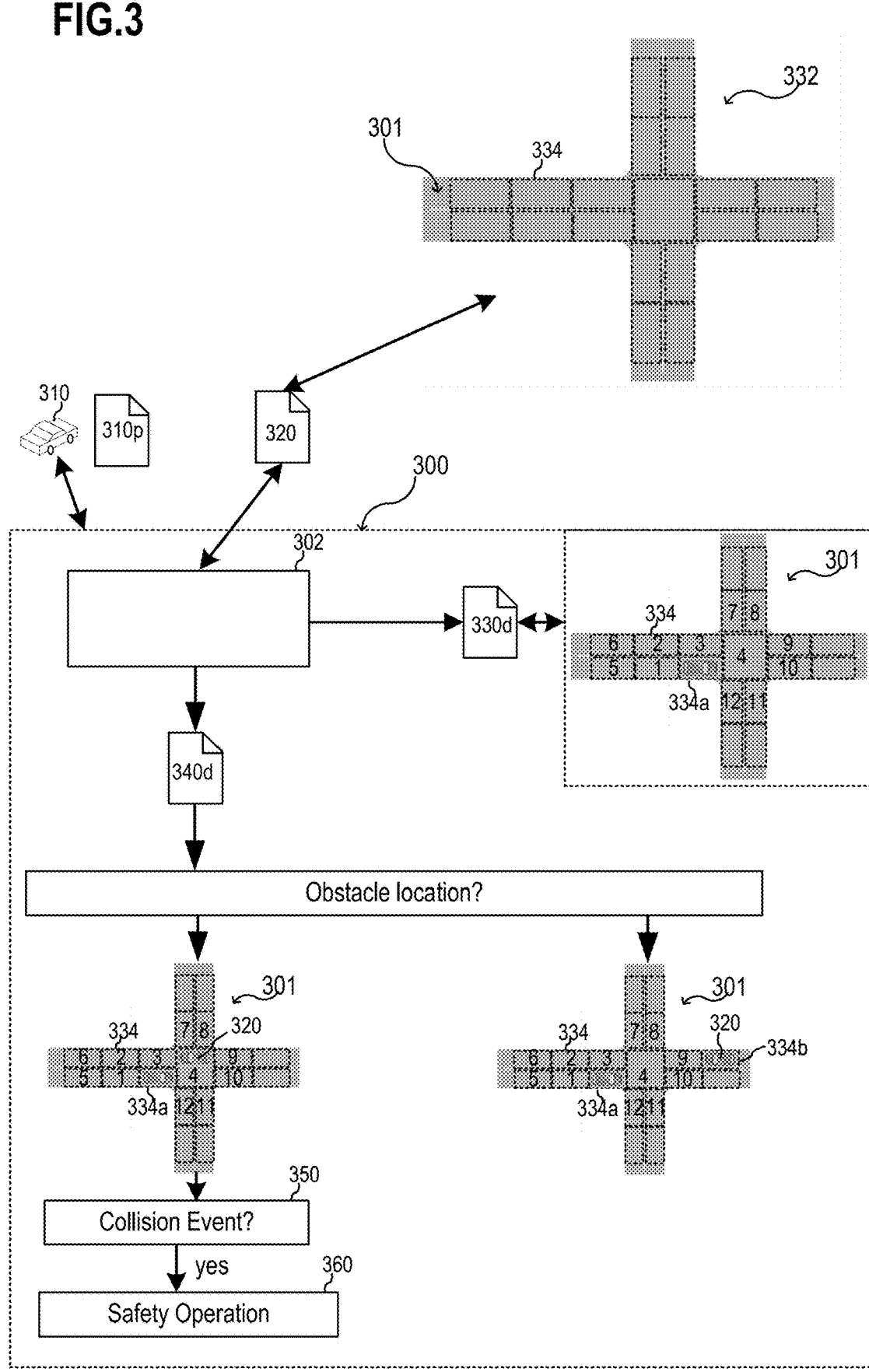
FIG. 3 shows a safety system in a schematic view, according to some aspects.

FIG. 3 illustrates a safety system 300 in a schematic view, according to various aspects. The safety system 300 may include one or more processors 302. The one or more processors 302 may be part of a computing system of a vehicle and/or communicatively coupled with a computing system of a vehicle. The safety system 300 and/or the one or more processors 302 of the safety system 300 may be associated with an ego-vehicle 310 of the safety system 300. The safety system 300 and/or the one or more processors 302 of the safety system 300 may be integrated into, partially integrated into, or communicatively coupled with an automated driving system or any other computing system of the ego-vehicle 310, as an example.

According to various aspects, the safety system 300 and/or the one or more processors 302 of the safety system 300 may be configured to obtain (e.g., determine and/or receive) map data 320. The map data 320 may indicate (e.g., represent) a road network 301 in a lane-based coordinate system 332. The map data 320 may indicate (e.g., represent) a road network 301 in a lane-based map. The lane-based coordinate system 332 may include a plurality of lane segments 334 corresponding to one or more roads of the road network 301. A map that is based on a lane-based coordinate system 332 may have data associated with each of the lane segments 334, e.g., one or more widths associated with the lane segment, one or more lengths associated with the lane segment, one or more geolocations of the lane segment, as examples. Based on the lane segments 334 and the position of objects within the lane segment 334, distances between objects can be determined (e.g., calculated) in the lane-based coordinate system 332.

According to various aspects, the safety system 300 (e.g., the one or more processors 302 of the safety system 300) may be configured to determine current lane segment data 330d indicating a lane segment in which the ego-vehicle 310 is located (e.g., in this exemplary case lane segment 334a). The determination of the lane segment in which the ego-vehicle 310 is located may be based on any suitable type of position information 310p that is available. The position information 310p may indicate a position of the ego-vehicle 310 in a Cartesian coordinate system associated with the road network 301. The position in the Cartesian coordinate system may be transformed into a position (e.g., within a lane segment) in the lane-based coordinate system 332. The transformation may be performed via the one or more processors 302 of the safety system 300. Alternatively, the position information 310p may indicate a position of the ego-vehicle 310 in the lane-based coordinate system 332.

According to various aspects, the safety system 300 (e.g., the one or more processors 302 of the safety system 300) may be configured to determine relevant set data 340d indicating a relevant set of lane segments of the plurality of lane of segments. The relevant set of lane segments may include, for example, only lane segments that are located within a safety-range (e.g., measured along lane segments in the lane-based coordinate system 332) from the lane segment in which the ego-vehicle 310 is located (e.g., from lane segment 334a). By way of example, the ego-vehicle 310 may be located in the lane segment 334a, as illustrated in FIG. 3. Depending on the used safety range and/or the type of rules to apply the safety range in the lane-based coordinate system 332, a relevant set of lane segments for the ego-vehicle 310 may include, for example, the lane segments denoted with the numbers 1 to 4. As another example, in the case that a greater safety range may be considered (e.g., for traffic situations with usually higher involved velocities and/or with lanes/roads with higher speed limits), the relevant set of lane segments for the ego-vehicle 310 may additionally include, for example, the lane segments denoted with the numbers 5 to 12. According to various aspects, even though lane segments of a lane-based coordinate system may be denoted herein with numbers or tuples, it may be understood that any suitable type of denotation(s) or combinations thereof may be used that allows identification of the respective lane segment in the lane-based coordinate system.

According to various aspects, the safety system 300 (e.g., the one or more processors 302 of the safety system 300) may be configured to determine a potential collision event 350 between the ego-vehicle 310 and one or more relevant obstacles 320. The determination of a potential collision event 350 between the ego-vehicle and for an obstacle, e.g., in the case that the one or more obstacles 320 are located within a lane segment that is included in the relevant set of lane segments for the ego-vehicle 310, may be based on a location of the obstacle. As an example, if an obstacle 320 (e.g., another vehicle) is located within one of the lane segments denoted with the numbers 1 to 4 (e.g., in the lane segment denoted with the number 4 as illustrated in FIG. 3) or within the same lane segment 334a as the ego-vehicle 310, a potential collision event 350 between the ego-vehicle 310 and the obstacle 320 may be determined, since the lane segment in which the obstacle 320 is located is, in this case, part of the relevant set of lane segments. As another example, if an obstacle 320 (e.g., another vehicle) is not located within one of the lane segments of the relevant set of lane segments (e.g., in the lane segment 334b as illustrated in FIG. 3), it may not be regarded as a candidate for a determination of a potential collision, since the lane segment in which the obstacle 320 is located (e.g., lane segment 334b) is not part of the relevant set of lane segments.

According to various aspects, the safety system 300 (e.g., the one or more processors 302 of the safety system 300) may be configured to determine lane segment data indicating a lane segment in which the obstacle 320 is located, e.g., in this exemplary case, the lane segment denoted with the number 4 or the lane segment 334b. The result of the determination of the lane segment in which the obstacle 320 is located may be used for the determination of a potential collision event 350. The determination of the lane segment in which the obstacle 320 is located may be based on any suitable type of position information available. The position information may indicate a position of the obstacle 320 in a Cartesian coordinate system associated with the road network 301 and transformed into the lane-based coordinate system 332 by the one or more processors 302 of the safety system 300. Alternatively, the position information may indicate a position of the obstacle 320 in the lane-based coordinate system 332.

According to various aspects, the safety system 300 (e.g., the one or more processors 302 of the safety system 300) may be configured to instruct a safety operation 360 in the case that the potential collision event is determined to avoid a potential collision. In at least one aspect, a variety of techniques may be used to perform a safety operation for collision avoidance.

According to various aspects, the safety system 300 (e.g., the one or more processors 302 of the safety system 300) may be configured to receive information, e.g., position information, speed limit information, traffic information, and/or current velocity information, etc. In some aspects, the information may be provided to the one or more processors 302 from a sensing module of an automated driving system. In other aspects, the information may be provided to the one or more processors 302 with any suitable technique, e.g., the information may be transmitted wirelessly to a receiver that may be communicatively coupled with the one or more processors 302 of the safety system 300.

According to various aspects, all lane segments that may be considered relevant may be calculated from the perspective of the ego-vehicle 310. A lane segment may be considered relevant in the case that an obstacle 320 in this lane segment would be able to cause a conflict with the ego-vehicle 310. For this assessment, the determination as to whether the obstacle 320 is able to cause a conflict with the ego-vehicle 310, the maximum allowed velocity differences may be considered, for example. As a result, no "online" route calculations for the obstacles in the environment of the ego-vehicle 310 may be necessary, compared to the approach illustrated exemplarily in FIG. 1B. Instead, according to various aspects, the relevant set of lane segments may be determined (e.g., calculated) only once for each time step (e.g., for a second or a time less than a second). Obstacles that are not located within these relevant lane segments may be excluded from further investigation because non-relevant lane segments cannot cause any conflicts (e.g., safety driving model conflicts) within a current reaction time segment. It may be noted that excluding one or more obstacles from further investigations by a mathematical check whether or not the one or more obstacles are within a lane segment that is part of the relevant set of lane segments, as described herein according to various aspects, may result in a reduction of computational complexity and/or computational effort for collision event determinations.

According to various aspects, a maximum distance for obstacles to be considered (e.g., a safety-range) may be evaluated. The upper bound of the maximum distance may be defined by a situation where the ego-vehicle 310 and the other vehicle 320 are approaching each other in opposite driving directions (referred to as an adversarial situation). In some cases, the maximum distance may be a generic distance, since the speed of the opposite vehicle may be unknown. Therefore, it may be useful to specify a maximum velocity for vehicles that are moving in opposite directions. A useful estimation for a maximum velocity of each of the vehicles that are moving in opposite directions may be the maximum allowed speed limit associated with the route of the vehicles plus an additional margin, if desired, to consider moderate speeding. Given this maximum velocity of the vehicles, the maximum distance may be determined (e.g., calculated based on safety driving model rules).

Given this maximum distance, all relevant lane segments may be determined accordingly. These may be all lane segments connected either laterally or longitudinally with the lane segment in which the ego-vehicle 310 is located. It may, in some aspects, be useful to also consider lanes having two-way traffic into account. When the relevant set of lane segments are known, a check to see whether an obstacle is relevant or not may implemented by a look-up (e.g., look-up table). If, for example, the lane segment in which the obstacle is located is part of a relevant segment list, then the obstacle may be relevant. The relevant segment list (or any other suitable data set) may indicate each lane segment of the plurality of lane segments that is in the relevant set of lane segments. This procedure may remove the computational load from determining route intersects between the ego-vehicle 310 and one or more non-relevant obstacles found in brute-force approaches.

According to various aspects, a safety system, as described herein, may be used in a vehicle and the relevant set of lane segments may be determined online, e.g., for each time step, from the available data, e.g., from the position of the vehicle and from the map data indicating a road network in a lane-based coordinate system or lane-based map.

According to various aspects, velocity information may be available that indicates the velocity of an obstacle, e.g., the velocity of another vehicle driving in an opposing direction towards the ego-vehicle. Therefore, velocity areas may be defined for the vehicle driving in opposing direction. So if the velocity of the vehicle driving in opposing direction is small, less lane segments may become relevant. It may be possible to store different sets of relevant lane segments, assigned to the corresponding lane segment, as a function of the velocity of the obstacle.

Figure 4:
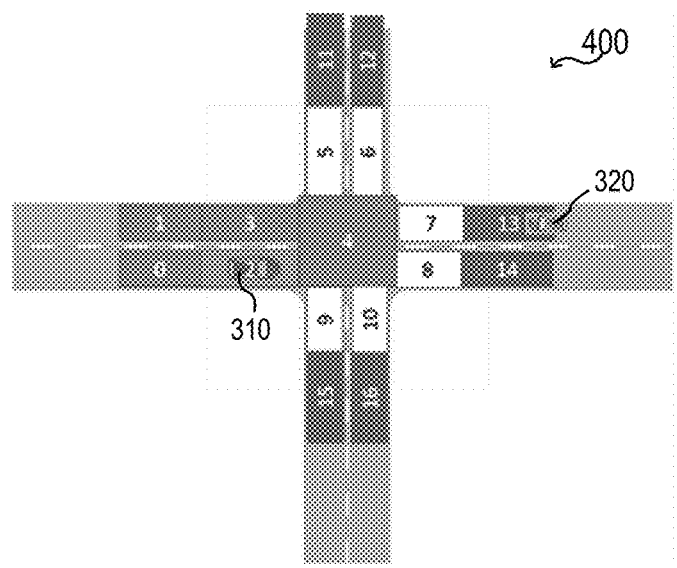
FIG. 4 shows a traffic situation in a lane-based coordinate system and various lane segments having different relevance as a function of one or more conditions, according to some aspects.

FIG. 4 shows a traffic situation 400 in a lane-based coordinate system and the relevance of various lane segments for different opposing object velocities, according to various aspects. In some aspects, for instance, the number of lane segments considered relevant may be a function of the velocity of one or more obstacles present in the vicinity of the ego-vehicle 310, e.g., the number of lane segments considered relevant may be a function of the velocity of vehicle 320 driving in an opposing direction to the ego-vehicle 310.

For example, the ego-vehicle 310 may be located in the lane segment denoted with the number 2. The lane segments denoted with the numbers 0-4 may be, according to some aspects, regarded as always relevant. Therefore, a minimal relevant set of lane segments may include five lane segments, 0-4. Further, the lane segments denoted with the numbers 5-10 may, in some aspects, also be regarded as relevant for a higher velocity range. Further, the lane segments denoted with the numbers 11-15 may, in at least one aspect, also be regarded as relevant if the vehicle 320 driving in opposing direction has a maximum allowed speed.

As shown exemplarily in FIG. 4, the relevant set of lane segments may be determined differently under different conditions, e.g., for different velocities of the vehicle 320 driving in an opposing direction to that of the ego-vehicle 320. In a similar way, other conditions may be used to differentiate the relevant set of lane segments to be used, e.g., the velocity of the ego-vehicle 310, a time-dependent speed limit on the road, and/or a time dependent amount of traffic, etc.

Figure 5A:
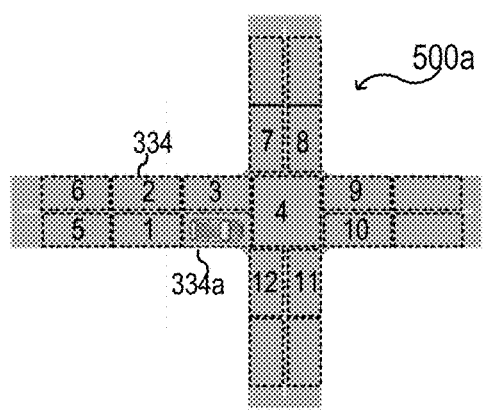
FIGS. 5A and 5B show a relevant set of lane segments for different locations of a vehicle in an exemplary traffic situation, according to some aspects.
Figure 5B:
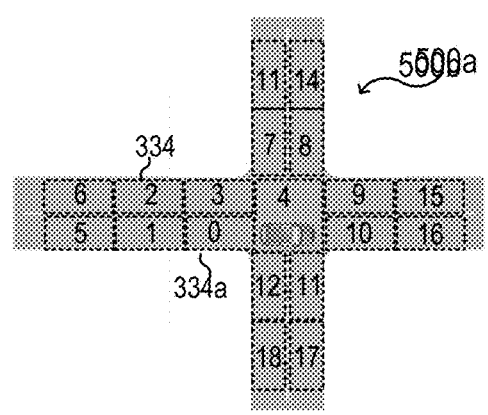

FIG. 5A and FIG. 5B show a development of a relevant set of lane segments at different times 500a, 500b for the ego-vehicle 310 as it moves, according to various aspects. At a first time 500a, the lane segments denoted by the numbers 1-12 around the lane segment 334a in which the ego-vehicle 310 is located may be part of the relevant set of lane segments. The lane segment 334a (see also number 0) in which the ego-vehicle 310 is located may, in some aspects, be part of the relevant set of lane segments as well. As the ego-vehicle 310 moves, e.g., at a second time 500b, the lane segments denoted by the numbers 5 and 6 may be no longer relevant, i.e. no longer part of the relevant set of lane segments at the second time 500b, the lane segments denoted by the numbers 0-4 and 7-12 may remain relevant, i.e., may be part of the relevant set of lane segments at the second time 500b, and the lane segments denoted by the numbers 13-18 may become relevant, i.e. may be part of the relevant set of lane segments at the second time 500b.

As illustrated in FIG. 5B, major parts of the relevant set of lane segments remain the same while the ego-vehicle 310 is moving. Only some lane segments behind the ego-vehicle 310 may be removed from the relevant set of lane segments and some new lane segments may be added to the relevant set of lane segments. If the relevant set of lane segments are stored in one or more memories accordingly, this may reduce computational effort, since, according to some aspects, only changes in the relevant set of lane segments have to be considered after a first initial relevant set of lane segments has been determined.

According to various aspects, an initial determination of the relevant set of lane segments may increase computational resource utilization to obtain all relevant lane segments. However, the determination may be only needed once. According to various aspects, the determination (e.g., calculation) of the relevant set of lane segments may be performed offline and stored together with the map information. Illustratively, a lane-based map may include additional information to allow for an efficient determination of the risk of a collision of the ego-vehicle 310 with one or more obstacles.

Figure 6:
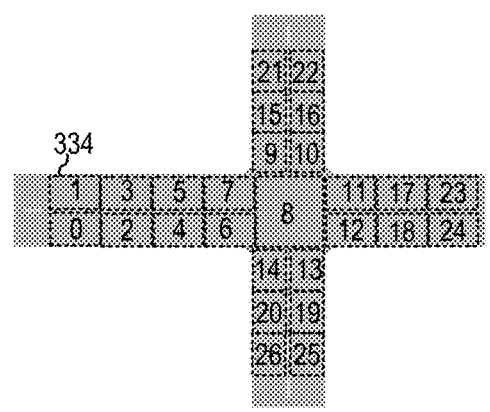
FIG. 6 shows an example of a part of a lane-based map with a plurality of lane segments, according to some aspects.

As an example, each respective lane segment of a lane-based map may have information associated therewith indicating all relevant lane segments for each respective lane segment. In an offline case, the velocity of the ego-vehicle 310 and of all other obstacles may be unknown. However, the safety-range for the determination of the relevant lane segments may be defined, for example, by the same maximum velocity for the ego-vehicle 310 and all other vehicles. For increased computational efficiency, one or more memories may, in some aspects, be configured to store different sets of relevant lane segments for one or more velocities of the ego-vehicle 310. If the ego-vehicle 310 is traveling a lower speed, a further reduction may be realized based on the consideration of a limited set of lane segments (referred to herein a relevant set of lane segments or set of relevant lane segments). With reference to FIG. 6, that shows an example of a part of a lane-based map 600 with 27 lane segments, an example of stored sets of relevant lane segments may be shown in the following TABLE 1.

TABLE 1

| Lane Segment | Relevant Lane Segments Condition 1 | Relevant Lane Segments Condition 2 | Relevant Lane Segments Condition 3 |
|---|---|---|---|
| 2 | 0-5 | 0-7 | 0-8 |
| 4 | 2-7 | 2-8 | 2-14 |
| 6 | 4-8 | 4-14 | 4-20 |
| 8 | 6-14 | 6-20 | 6-26 |

The different conditions (condition 1-3) may include or may be associated with different relevant speed limits, e.g., 30 km/h, 50 km/h, and 70 km/h. However, various other conditions (e.g., various conditions of the same type or conditions of various different types, for instance speed limit ranges) may be used to create and store different sets of relevant lane segments for each lane segment of the plurality of lane segments of a lane-based map.

Figure 7:
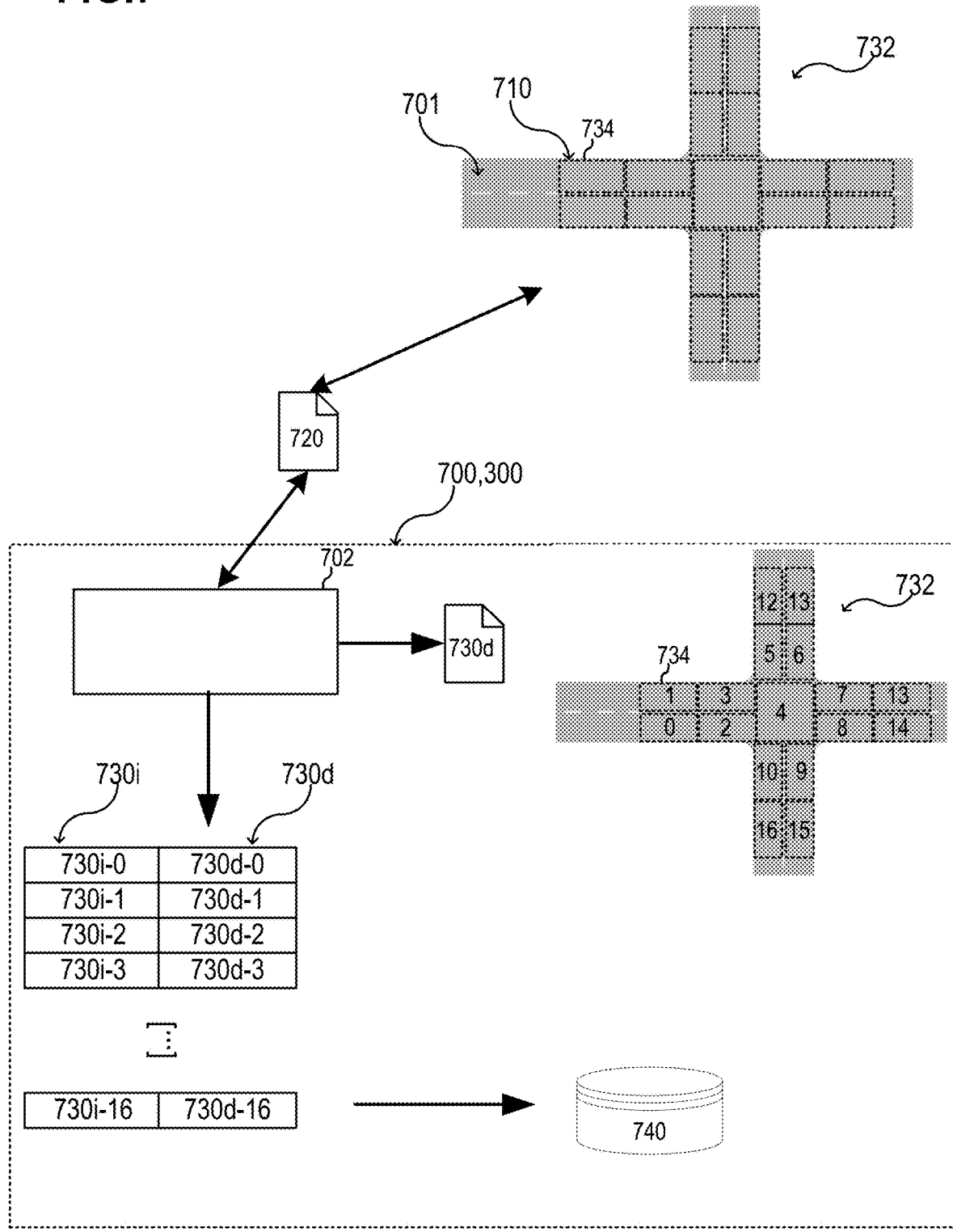
FIG. 7 shows a map generator for generating and/or enhancing a lane-based map, according to some aspects.

FIG. 7 illustrates a map generator 700, according to various aspects. The map generator 700 may be, in some aspects, configured to generate an enhanced lane-based map from an initial lane-based map or to generate additional data sets associated with an initial lane-based map. The enhanced lane-based map or the additional data sets may include data sets indicating the following: a relevant set of lane segments associated with one or more lane segment of the lane-based map, one or more connecting routes between a respective lane segment and one or more other lane segments of the lane-based map, and/or a lane segment network having one or more lane segment connections between a respective lane segment and one or more other lane segments of the lane-based map.

According to various aspects, the map generator 700 may be integrated into a safety system 300 associated with an ego-vehicle 310, e.g., and configured to perform online determinations. The online determinations may include the following: determine a relevant set of lane segments associated with one or more lane segment of the lane-based map, determine one or more connecting routes between a respective lane segment and one or more other lane segments of the lane-based map, and/or determine a lane segment network having one or more lane segment connections between a respective lane segment and one or more other lane segments of the lane-based map.

In other aspects, the map generator 700 may be configured to operate independently (e.g., not associated with a specific traffic situation, e.g., not associated with an ego-vehicle and/or one or more obstacles). In this case, offline determinations may be performed to generate data sets that can be used later in a safety system to perform one or more safety operations. The offline determinations may include at least one of the following: determine a relevant set of lane segments associated with one or more lane segment of the lane-based map, determine one or more connecting routes between a respective lane segment and one or more other lane segments of the lane-based map, and/or determine a lane segment network having one or more lane segment connections between a respective lane segment and one or more other lane segments of the lane-based map.

According to various aspects, the safety system 700 may be configured to create and store data sets representing the following: a relevant set of lane segments associated with one or more lane segment of the lane-based map, one or more connecting routes between a respective lane segment and one or more other lane segments of the lane-based map, and/or a lane segment network having one or more lane segment connections between a respective lane segment and one or more other lane segments of the lane-based map.

According to various aspects, a map generator 700 or a safety system 300 may include one or more processors 702 configured to obtain (e.g., determine and/or receive) lane segment data 720. The lane segment data 720 may indicate a set 710 of lane segments 734 in a lane-based coordinate system 732. The set 710 of lane segments 734 may correspond to one or more roads of a road network 701.

According to various aspects, the one or more processors 702 may be further configured to determine a data set 730$d$ for each respective lane segment of the set 710 of lane segments 734. The data set 730$d$ may indicate, according to various aspects, one or more connecting routes between the respective lane segment and one or more other lane segments of the set 710 of lane segments 734 (see, for example, FIG. 8).

According to various aspects, the one or more processors 702 may be further configured to assign a data-set-denomination tag 730$i$ to each data set 730$d$, the data-set-denomination tag 730$i$ indicating the respective lane segment corresponding to the data set 730$d$. For example, the set 710 of lane segments 734 may include the lane segments denoted by the numbers 0-16. For each of the lane segments 0-16 a corresponding data-set-denomination tag 730$i$-0, 730$i$-1, 730$i$-2, 730$i$-3, [ . . . ], 730$i$-16 may be used to indicate a respective lane segment 0-16 corresponding to the data set 730$d$-0, 730$d$-1, 730$d$-2, 730$d$-3, [ . . . ], 730$d$-16. According to various aspects, each respective lane segment of the set 710 of lane segments 734 has a corresponding data set 730$d$-0, 730$d$-1, 730$d$-2, 730$d$-3, [ . . . ], 730$d$-16 unambiguously assigned thereto.

According to various aspects, the one or more processors 702 may be further configured to store the data set 730$d$ and the data-set-denomination tag 730$i$ assigned thereto in one or more memories 740. Storing the data set 730$d$ and the data-set-denomination tag 730$i$ assigned thereto may allow an efficient calculation of routes in subsequent operations performed by a safety system (see, for example, FIG. 8).

According to various aspects, the set 710 of lane segments 734 may include only relevant lane segments. The relevant lane segments may be determined as described herein, for example, with reference to FIGS. 3 to 6. According to various aspects, in the case that the set 710 of lane segments 734 is the relevant set of lane segments, the set 710 of lane segments 734 may be used, for example, to determine, whether one or more obstacles are to be considered during a safety operation performed by a safety system or not, e.g., whether one or more obstacles are to be considered in a determination of a potential collision event performed by the safety system 300, 900 described herein. Since information about the one or more connecting routes between a respective lane segment and each respective other lane segment of the set 710 of lane segments 734 may be available by accessing the one or more memories, a route of an obstacle from the lane segment in which the obstacle is located to the lane segment in which the ego-vehicle 310 is located, may be determined by a lookup (see, for example, FIG. 8). The lane segment in which the ego-vehicle 310 is located may be determined, and based thereon, the corresponding data set 730d may be retrieved from the one or more memories 740. In the corresponding data set 730d, all connecting routes from other lane segments to the lane segment in which the ego-vehicle 310 is located may be included. Therefore, based on a determined lane segment in which an obstacle is located, the respective connecting route may be ascertained efficiently (see, for example, FIG. 8). If the connecting route is determined, algorithms (e.g., including a safety driving model) may be used to determine a potential collision event and collision avoidance techniques may be employed to avoid a collision with the obstacle in the case that a potential collision event is determined.

Figure 8:
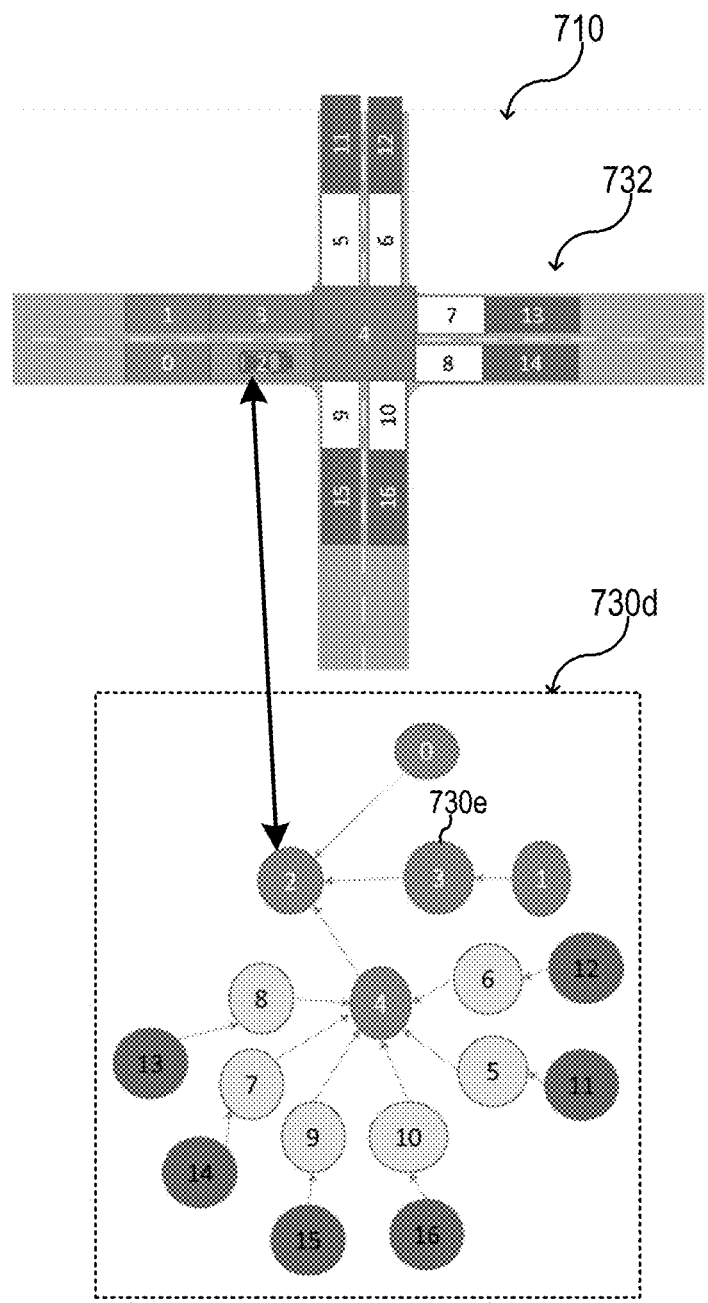
FIG. 8 shows an example of a data set that indicates one or more connecting routes associated with a lane segment of a lane-based map, according to some aspects.

FIG. 8 shows an example of a data set 730d that indicates one or more connecting routes 802 between a respective lane segment (e.g., in this exemplary case data set 730d-2 that corresponds to the lane segment denoted by the number 2) and one or more other lane segments of the set 710 of lane segments 734 (e.g., in this case the lane segments denoted by the numbers 0, 1, and 3-16).

According to various aspects, the lane segment corresponding to the respective data set 730d (e.g., in this exemplary case data set 730d-2 that corresponds to the lane segment denoted by the number 2) may be a center of a lane segment network having one or more lane segment connections between the respective lane segment and each of a plurality of other lane segments of the set 710 of lane segments. According to various aspects, each lane segment entry 730e of the data set 730d may hold information about its predecessor (e.g., implemented by a linked list). As an example, the lane segment entry denoted by the number 16 (corresponding to the lane segment denoted by the number 16) may indicate (e.g., point to) its predecessor, which may be in this case the lane segment entry denoted by the number 10, further, the lane segment entry denoted by the number 10 (corresponding to the lane segment denoted by the number 10) may indicate (e.g., point to) its predecessor, which may be in this case the lane segment entry denoted by the number 4, further, the lane segment entry denoted by the number 4 (corresponding to the lane segment denoted by the number 4) may indicate (e.g., point to) its predecessor, which may be in this case the lane segment entry denoted by the number 2. Therefore, for each lane segment a path or route to an ego-vehicle segment (which may be in this case the lane segment entry denoted by the number 2) may be ascertained efficiently.

According to various aspects, the one or more connecting routes may be shortest connecting routes from each respective lane segment (e.g., lane segments 0-4, or 0-10, or 0-16) to the lane segment corresponding to the respective data set 730d that is within a corresponding safety-range. The safety-range may be defined by a predefined maximal velocity (e.g., a speed limit or a speed limit and an additional margin) associated with one or more lane segments of the set of lane segments.

Figure 9A:
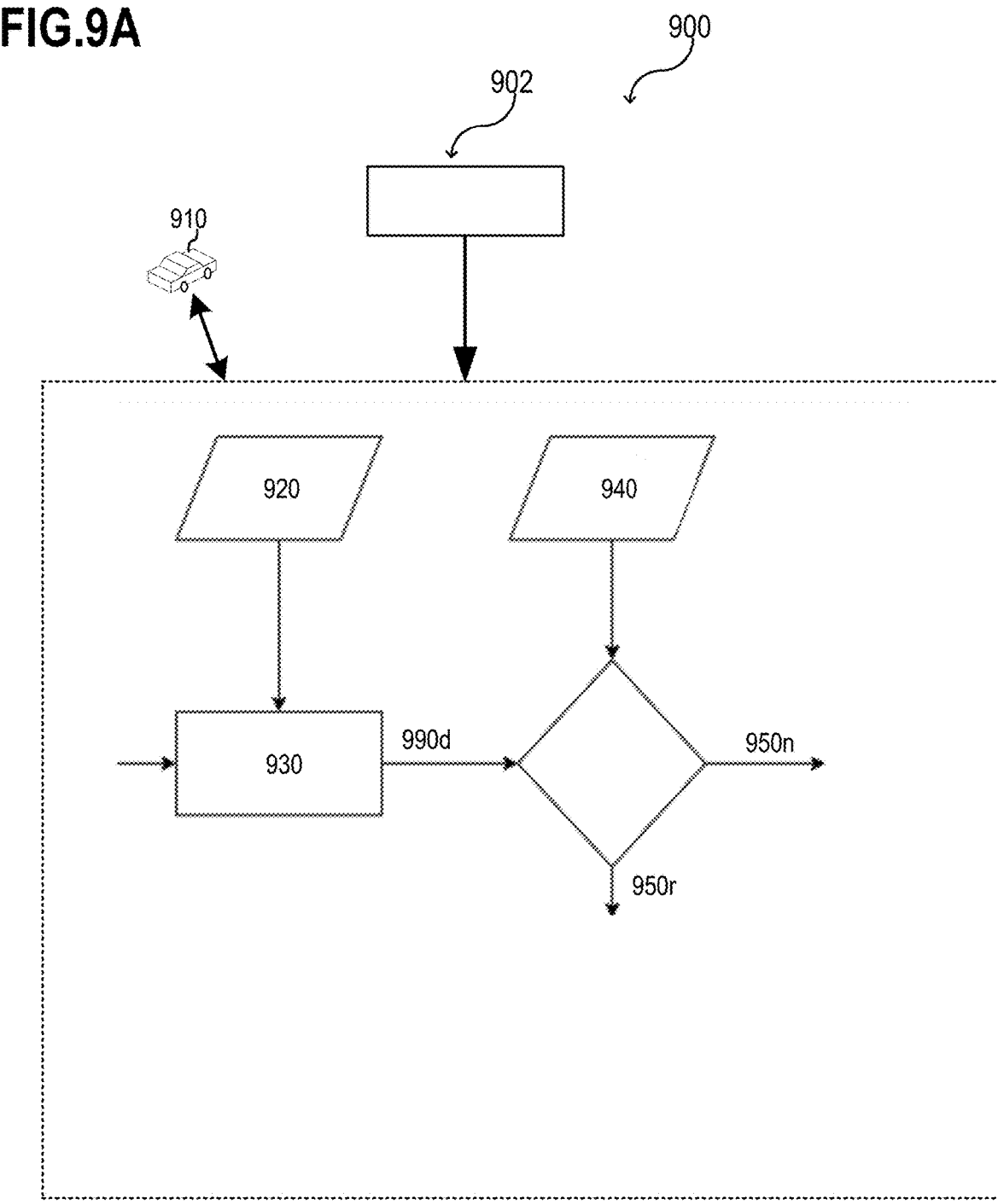

FIG. 9A shows a safety system 900 for use with a vehicle (e.g. in a vehicle, integrated with a vehicle, partially integrated with a vehicle, or coupled with a vehicle), according to various aspects. The vehicle may be an ego-vehicle 910 associated with the safety system 900. The safety system 900 may include one or more processors 902 configured to obtain (e.g., to receive and/or to determine) vehicle position data 920 indicating a position of the vehicle 910. The position of the ego-vehicle 910 may be referred to as an ego-position.

The one or more processors 902 may be further configured to obtain (e.g., to receive and/or to determine) vehicle-lane-segment data 930 indicating a lane segment in a lane-based coordinate system in which the vehicle 910 is located. The vehicle-lane-segment data 930 may be obtained based on the vehicle position data 920. The vehicle-lane-segment data 930 may be obtained based on the vehicle position data 920 and a lane-based map.

The one or more processors 902 may be further configured to determine one or more data sets 990d indicating one or more relevant sets of lane segments for the lane segment in which the vehicle 910 is located. The one or more relevant sets of lane segments may be, according to various aspects, related to the lane segment in which the ego-vehicle 910 is located and optionally, to one or more additional conditions, e.g., one or more velocity ranges, as example. The one or more relevant sets of lane segments may be defined, for example, based on a safety-range measured from the lane segment in which the ego-vehicle 910 is located towards all possible driving directions. The one or more data sets 990d may indicate the one or more relevant sets of lane segments and may be obtained (e.g., offline) by reading the corresponding data from one or more memories (see, for example, FIG. 9C). At least one suitable data set may be stored (in the one or more memories) for each lane segment of a lane-based map or for each lane segment in a vicinity of the lane segment in which the ego-vehicle 910 is located, as described herein. In other aspects, the one or more data sets 990d indicating the one or more relevant sets of lane segments may be obtained (e.g., online) based on map data. The map data indicating a road network in a lane-based coordinate system, as for example described herein.

The one or more processors 902 may be further configured to obtain (e.g., to receive and/or to determine) obstacle position data 940 indicating one or more lane segments in the lane-based coordinate system in which one or more obstacles are located.

The one or more processors 902 may be further configured to classify 950 an obstacle of the one or more obstacles either as a non-relevant obstacle 950n in the case that the lane segment in which the obstacle is located is not included in the one or more relevant sets of lane segments, or as a relevant obstacle 950r in the case that the lane segment in which the obstacle is located is included in the one or more relevant sets of lane segments.

According to various aspects, the classification of one or more obstacles may be based on lane-segment identification tags (IDs). As an example, a lane segment identification tag (e.g., a number or a tuple) may be assigned to each lane segment of the lane-based coordinate system. Further, each lane segment may have a list associated therewith, the list may have the same ID assigned thereto and may include all IDs of relevant lane segments associated with the respective lane segment. By determining a lane-segment ID of the lane segment in which the ego-vehicle 910 is located, it may be possible (in an efficient manner) to identify and obtain the list including all IDs of relevant lane segments associated with the lane segment in which the ego-vehicle 910 is located. By determining the lane-segment ID of the lane segment in which an obstacle is located, it may be determined (in an efficient manner), e.g., by comparison of IDs, whether this lane-segment ID is equal to one of the IDs of the relevant lane-segment IDs in the respective list that includes all IDs of relevant lane segment associated with the lane segment in which the ego-vehicle 910 is located.

In the following, some optional aspects of the safety system 900 that is described herein are shown with reference to FIG. 9B and FIG. 9C.

Figure 9B:
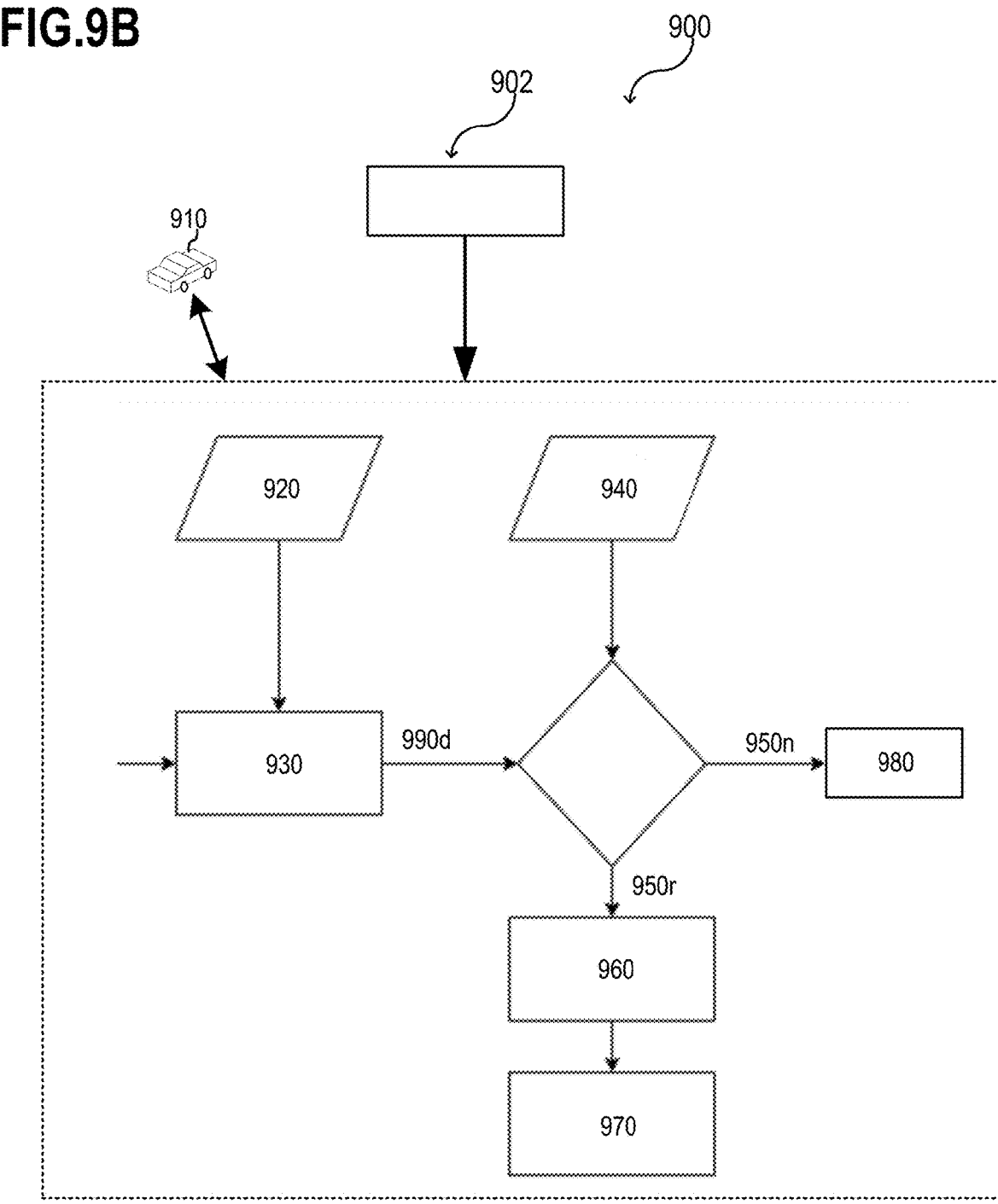

As shown in FIG. 9B, the one or more processors 902 of the safety system 900 may be further configured to determine a potential collision event between the ego-vehicle 910 and any obstacle that was classified as a relevant obstacle 950r. For the determination of such a potential collision event, a connecting route 960 between each relevant obstacle 950r and the ego-vehicle 910 is determined. The connecting route 960 may include the lane segment in which the ego-vehicle 910 is located, the lane segment in which the relevant obstacle 950r is located, and all lane segments connecting these two lane segments. The connecting route 960 may be determined to be a shortest connecting route to ensure that the determination of the potential collision event considers a worst-case scenario.

As an example, in the case that the ego-vehicle 910 is, for example, located in the lane segment denoted with the number 2, as shown in FIG. 8, the connecting route 960 between an obstacle that is located in the lane segment denoted with the number 12 may include the lane segments denoted with the numbers 12, 6, 4, and 2, the connecting route 960 between an obstacle that is located in the lane segment denoted with the number 10 may include the lane segments denoted with the numbers 10, 4, and 2, the connecting route 960 between an obstacle that is located in the lane segment denoted with the number 1 may include the lane segments denoted with the numbers 1, 3, and 2, and so forth.

Further, the determination of a potential collision event may include an algorithm (e.g., a safety driving model) that allows for the determination of the potential collision event based on the connecting route 960, e.g., in a lane-based coordinate system.

As shown in FIG. 9B, the one or more processors 902 of the safety system 900 may be further configured to discard 980 any non-relevant obstacle 950n from the determination of the potential collision event. As an example, no determination of a potential collision event may be performed by the safety system 900 for obstacles that are classified as a non-relevant obstacle 950n. As another example, any non-relevant obstacle 950n may be deleted from a list indicating obstacles to be considered for a determination of a potential collision event. As another example, any non-relevant obstacle 950n may be withheld from a list (e.g., by assigning a do not care value) indicating obstacles for a determination of a potential collision event.

As shown in FIG. 9C, the safety system 900 may further include one or more memories 990 having the data sets 990d stored therein. The one or more memories 990 may provide at least one data set for each respective lane segment of a plurality of lane segments for at least a region of interest of a lane-based coordinate system in a safety system (e.g., to one or more processors 902 of the safety system 900), according to various aspects. At least one data set that indicates the relevant set of lane segments may be assigned to a respective lane segment, as described herein. As an example, a first data set may be stored and assigned to a first lane segment, the first data set indicating one or more or all other lane segments that would be relevant if the ego-vehicle 910 is located in the first lane segment, a second data set may be stored and assigned to a second lane segment different from the first lane segment, the second data set indicating one or more or all other lane segments that would be relevant if the ego-vehicle 910 is located in the second lane segment, and so forth. In the case that the ego-vehicle 910 is, for example, located in the first lane segment, the first data set may be read from the memory 990 to obtain a relevant set of lane segments to the first lane segment. In the case that the ego-vehicle 910 is, for example, located in the second lane segment, the second data set may be read from the memory 990 to obtain a relevant set of lane segments to the second lane segment, and so forth.

In some aspects, the data sets may be created as described herein, e.g., via a map generator or any other suitable hardware, software, and/or combination of hard- and software.

According to various aspects, the data sets 990d indicating the sets of relevant lane segments may be calculated from map data 990m and one or more parameters 990p. The one or more parameters 990p may include a maximal velocity (e.g., a speed limit) and/or one or more safety driving model parameters.

According to various aspects, at least some of the required information (e.g., the data sets 990d indicating the sets of relevant lane segments) may be calculated offline. According to various aspects, at least some of the required information for relevance filtering and route creation may be stored in the map or may be stored in data (e.g., metadata) associated with the map. According to various aspects, additional information may be retrieved online based on, e.g., the position of the ego-vehicle 910 and/or the position of the one or more obstacles.

As described herein, a number of obstacles to be considered during a determination of a possible collision event may be reduced by obtaining a relevant set of lane segments and checking, whether an obstacle is within a lane segment of the relevant set of lane segments or not.

According to various aspects, the number of obstacles under consideration may be reduced by filtering the remaining relevant obstacles using, for example, a model-based approach.

Figure 10A:
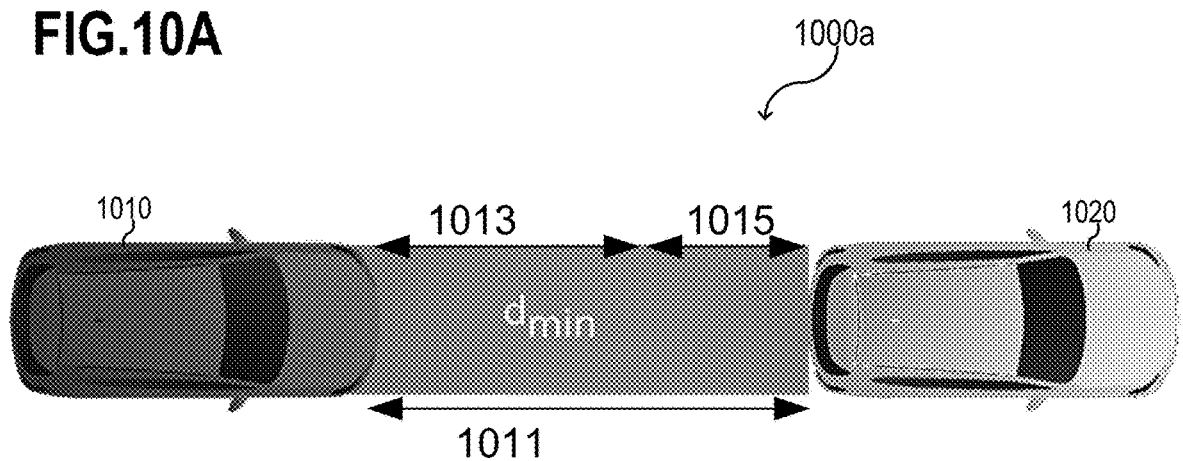
FIG. 10A shows a model-based approach to reduce the number of obstacles to be considered by a safety system, according to some aspects.

FIG. 10A illustrates a traffic situation 1000a and model-based approach to reduce the number of obstacles under consideration, according to various aspects. In some traffic situations, as illustrated exemplarily in FIG. 10A, an ego-vehicle 1010 may follow another vehicle 1020. According to various aspects, a safety system (e.g., safety system 300 or safety system 900 described herein) may determine that a traffic situation may be safe for the ego-vehicle 1010 at a first time point t. If, in this case, it may be determined that the distance 1011 between the ego-vehicle 1010 and the other vehicle 1020 (e.g., the other vehicle 1020 may be regarded as obstacle) is greater than a safety distance 1013 (e.g., a minimal safety distance indicated by a safety driving model), and that the additional margin 1015 (e.g., the difference between the actual distance 1011 and the safety distance 1013) may be of sufficient value that the other vehicle cannot physically accelerate/decelerate enough to completely reduce this additional margin 1015 within the next time interval $\Delta T$, a re-evaluation in the next time step (e.g., at a second time point $t+\Delta T$) may not be necessary and can be skipped, as the situation would most likely remain safe in view of the model-based approach. A re-evaluation may be performed later (e.g., at a third time point $t+2\Delta T$ or at any time point after the second time point $t+2\Delta T$). Following a model-based approach, it may be therefore possible to further reduce the number of safety driving model checks or other safety checks that may be otherwise performed at each time step, and so to reduce the overall compute latency.

Figure 10B:
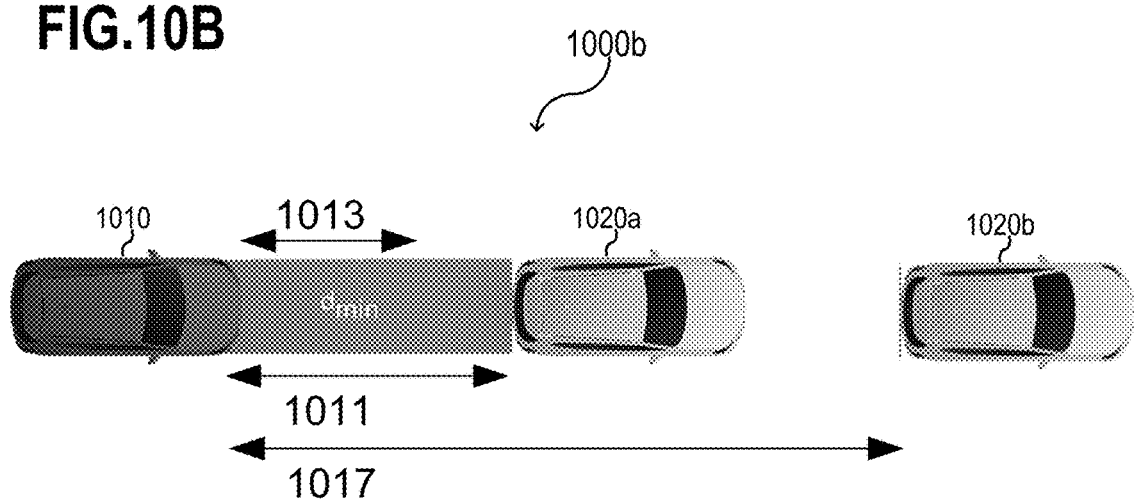
FIG. 10B shows a model-based approach to reduce the number of obstacles to be considered by a safety system, according to some aspects.

FIG. 10B illustrates a traffic situation 1000*b* and model-based approach to reduce the number of obstacles under consideration, according to various aspects.

In some traffic situations, as illustrated exemplarily in FIG. 10B, an ego-vehicle 1010 may follow first vehicle 1020*a*, and the first vehicle 1020*a* may follow a second vehicle 1020*b* (e.g., the first vehicle 1020*a* and the second vehicle 1020*b* may be regarded as obstacles in this case). According to various aspects, a safety system (e.g., safety system 300 or safety system 900 described herein) may determine that a traffic situation may be safe with respect to the first vehicle 1020*a* from the perspective of the ego-vehicle 1010, e.g., in the case that the distance 1011 between the ego-vehicle 1010 and the first vehicle 1020*a* is greater than a safety distance 1013 (e.g., a minimal safety distance indicated by a safety driving model). In this case, the traffic situation may be safe with respect to the second vehicle 1020*b* as well from the perspective of the ego-vehicle 1010, since the second vehicle 1020*b* may inevitably have a greater distance 1017 to the ego-vehicle 1010 than the first vehicle 1020*a*.

Following a model-based approach, it may be possible to further reduce the number of safety driving model checks that may be required at each time step, and so to reduce the overall compute latency.

Figure 11:
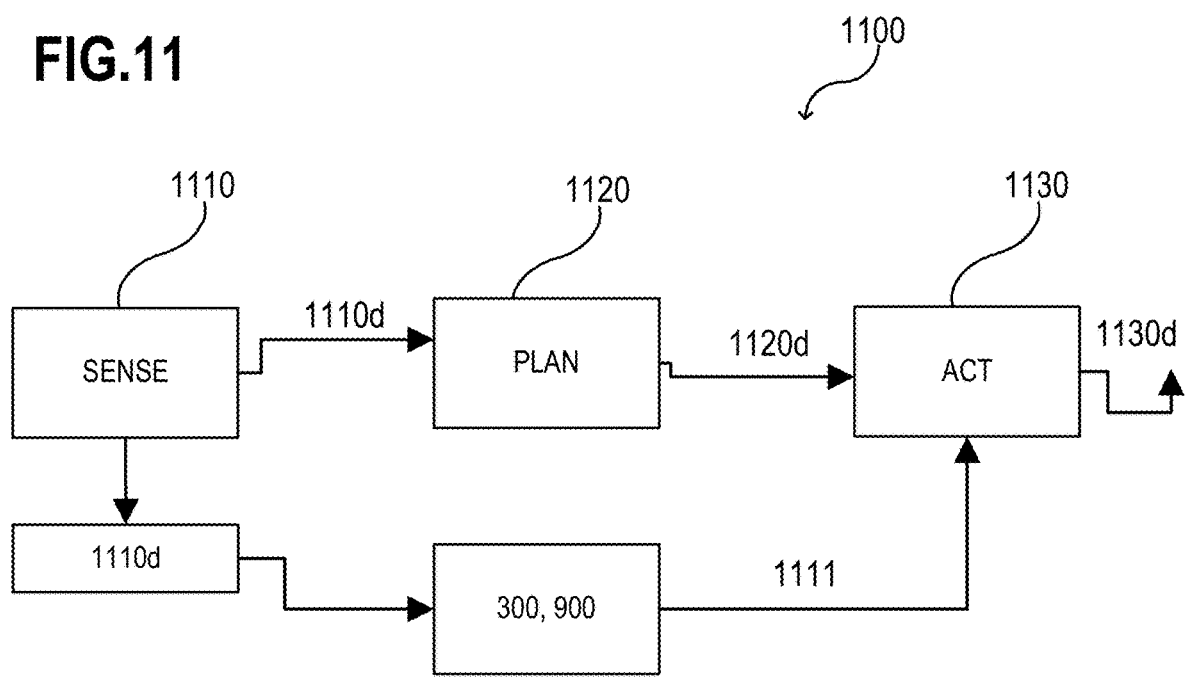
FIG. 11 shows an automated driving system in a schematic view, according to some aspects.

FIG. 11 illustrates an integration of a safety system (e.g., a safety system 300, 900 or a suitable safety driving model module) into an automated driving system 1100, according to various aspects. The automated driving system 1100 may be implemented in a vehicle (e.g., in the ego-vehicle) or may be communicatively coupled with a vehicle (e.g., with the ego-vehicle), according to some aspects. In some aspects, the automated driving system 1100 may include a sensing module 1110. The sensing module 1110 may be configured to create world model data 1110*d*. The world model data 1110*d* may be used to plan movement of the vehicle (e.g., of the ego-vehicle) based on a model. The automated driving system 1100 may further include a planning module 1120. The planning module 1120 may be configured to create control information 1120*d* based on the world model data 1110*d*. The control information 1120*d* may represent, for example, a trajectory the vehicle (e.g., in the ego-vehicle) should follow. According to various aspects, the automated driving system 1100 may further include an acting module 1130. The acting module 1130 may be configured to transform the control information 1120*d* received from the planning module 1120 into control commands 1130*d*. The control commands 1130*d* may include, for example, one or more signals to steer, throttle, and/or break the vehicle. The control commands 1130*d* may be received by any suitable component of the vehicle that is configured to control the vehicle accordingly.

According to various aspects, the automated driving system 1100 may include a safety system as described herein. The safety system may be configured to receive the world model data 1110*d* (e.g., including road sign information, map data, position information, and/or other information). According to various aspects, the acting module 1130 may be instructed by the safety system to perform one or more safety operations if necessary. As an example, in the case that the safety system has determined a likelihood of a potential collision, the safety system may be configured to send an instruction signal 1111 to the acting module 1130*d* to prevent the potential collision.

According to various aspects, the sensing module 1110 may be configured to determine a minimal safety distance to one or more obstacles from the world model data. The minimal safety distance may be used for a comparison with an actual distance between the vehicle and an obstacle and, the one or more safety operations may be instructed in the case that the actual distance is less than or equal to the minimal safety distance.

Figure 12:
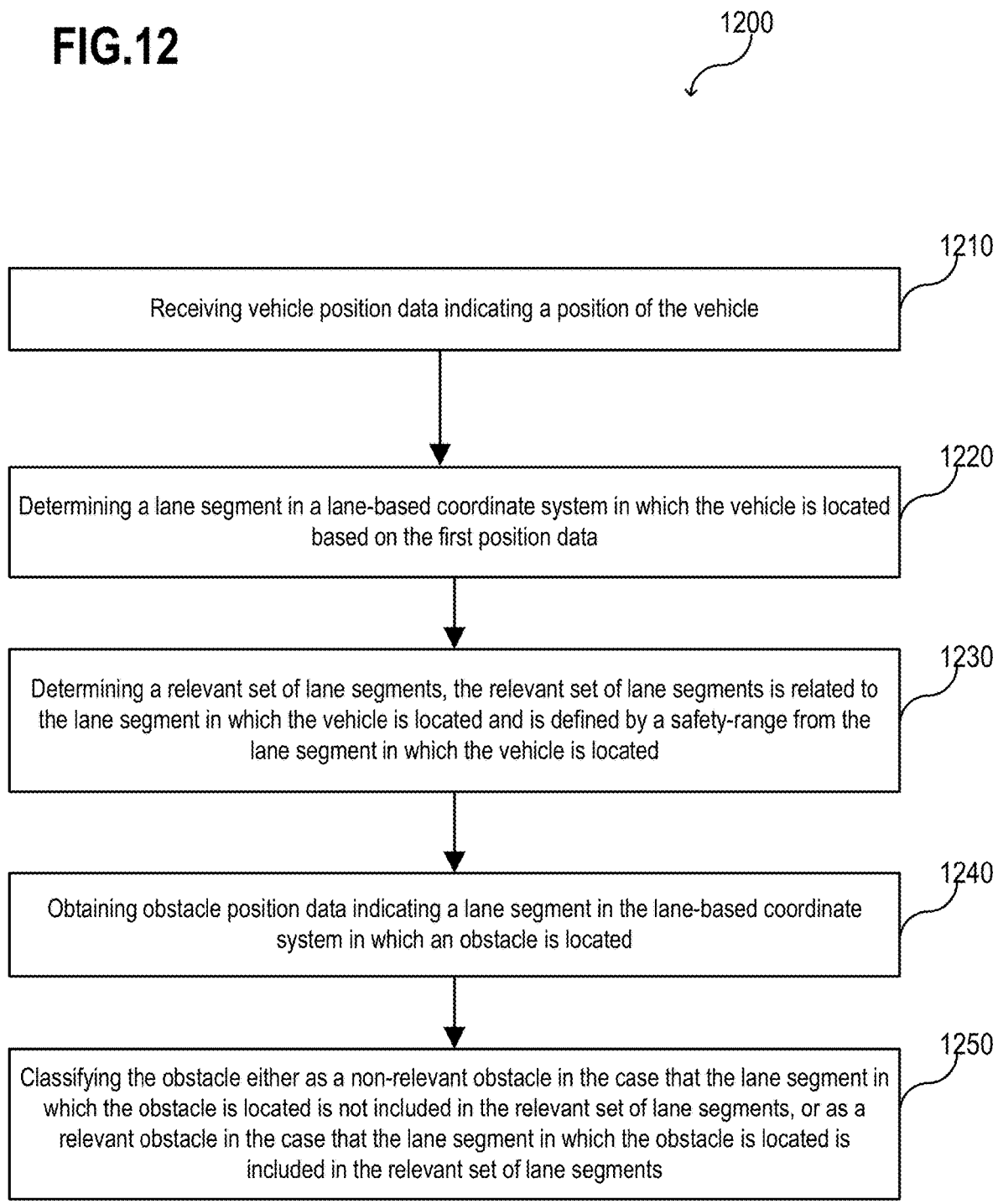
FIGS. 12 to 15 show various flow diagrams of various methods, according to various aspects.

FIG. 12 shows a schematic flow diagram of a method 1200, according to various aspects. In some aspects, the method 1200 may include classifying one or more obstacles based on a respective location of the one or more obstacles relative to a position of a vehicle. The classification may be based on a relevant set of lane segments for the vehicle. The relevant set of lane segments may be determined based on a safety-range associated with the vehicle. The method 1200 may include, in 1210, receiving vehicle position data indicating a position of the vehicle; in 1220, determining a lane segment in a lane-based coordinate system in which the vehicle is located based on the vehicle position data; in 1230, determining a relevant set of lane segments, the relevant set of lane segments being related to the lane segment in which the vehicle is located and is defined by a safety-range from the lane segment in which the vehicle is located; in 1240, obtaining obstacle position data indicating a lane segment in the lane-based coordinate system in which an obstacle is located; and, in 1250, classifying the obstacle either as a non-relevant obstacle in the case that the lane segment in which the obstacle is located is not included in the relevant set of lane segments, or as a relevant obstacle in the case that the lane segment in which the obstacle is located is included in the relevant set of lane segments.

According to various aspects, the lane segment in which the vehicle is located may be referred to as first lane segment for sake of simplicity. According to various aspects, the lane segment in which an obstacle is located may be referred to as second lane segment for sake of simplicity. However, the terms first and second may in this case not denote a number of a lane segment, as used above to identify specific lane segments of the lane coordinate system.

Figure 13:
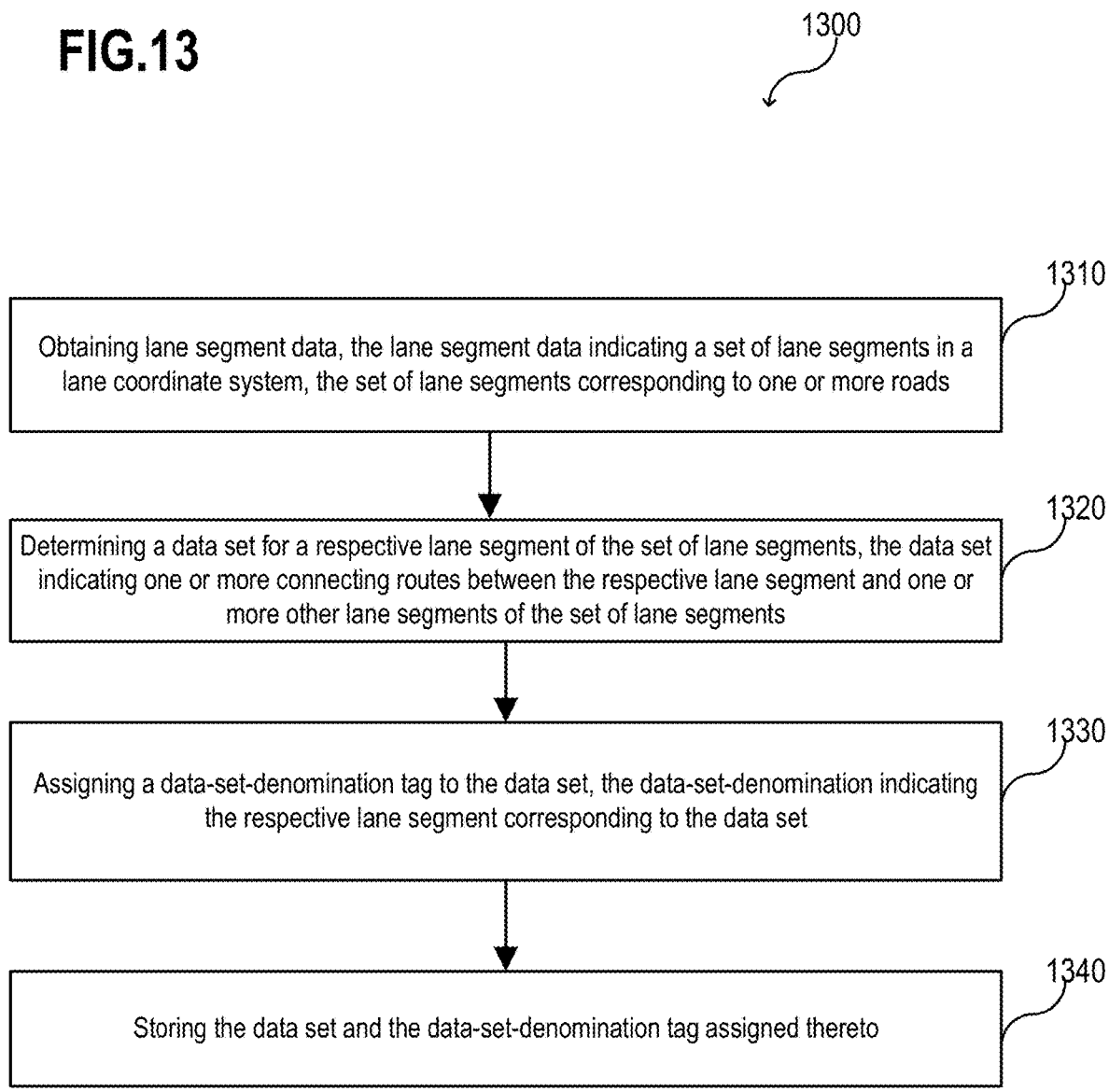

FIG. 13 shows a schematic flow diagram of a method 1300, according to various aspects. In some aspects, the method 1300 may include creating a map, modifying a map, or creating or modifying one or more data sets associated with a map. The method 1300 may include, in 1310, obtaining lane segment data, the lane segment data indicating a set of lane segments in a lane coordinate system, the set of lane segments corresponding to one or more roads; in 1320, determining a data set for a respective lane segment of the set of lane segments, the data set indicating one or more connecting routes between the respective lane segment and one or more other lane segments of the set of lane segments; in 1330, assigning a data-set-denomination tag to the data set, the data-set-denomination tag indicating the respective lane segment corresponding to the data set; and, in 1340, storing the data set and the data-set-denomination tag assigned thereto.

Figure 14:
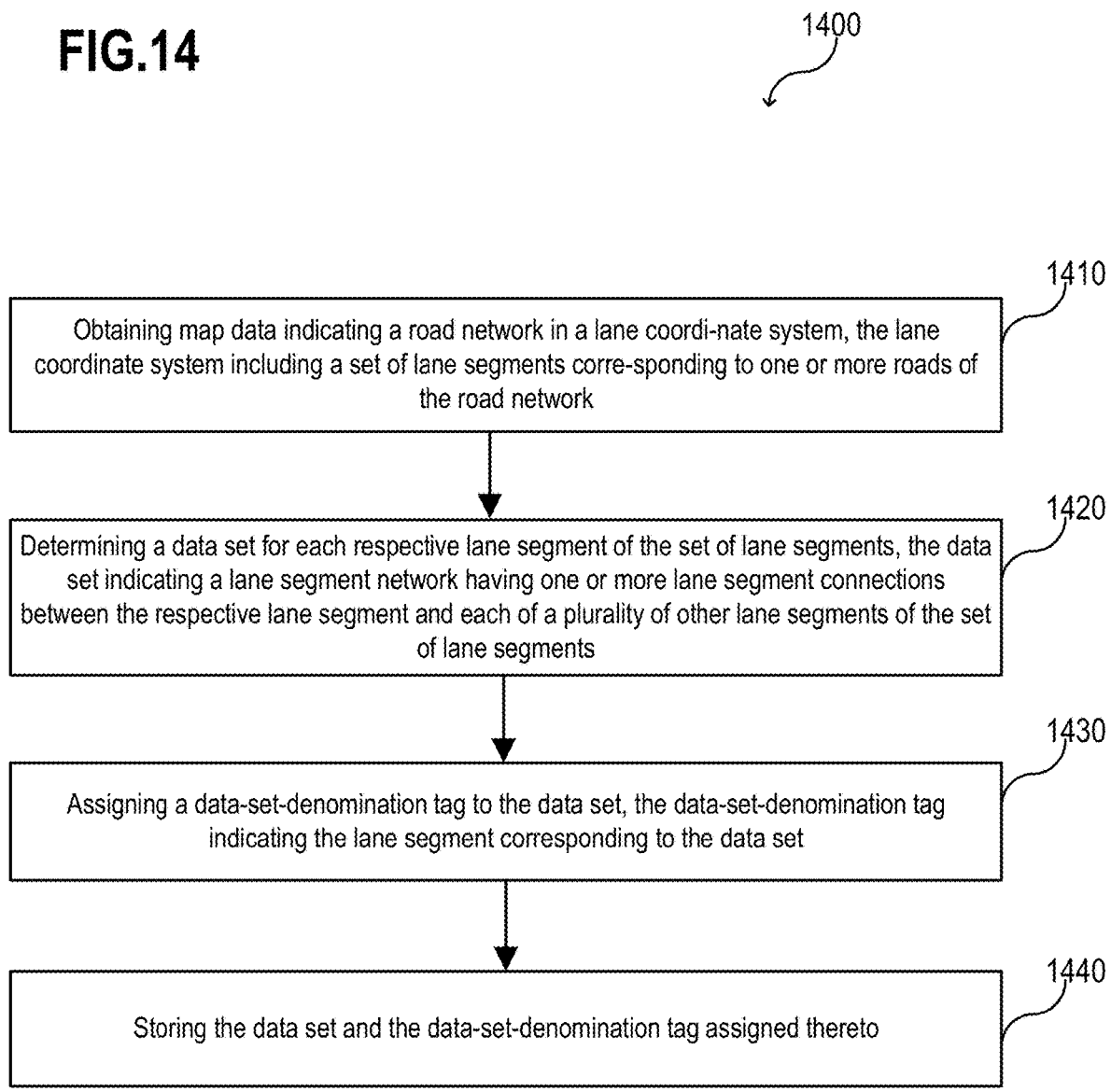

FIG. 14 shows a schematic flow diagram of a method 1400, according to various aspects. In some aspects, the method 1400 may include creating a map, modifying a map, or creating or modifying one or more data sets associated with a map. The method 1400 may include, in 1410, obtaining map data indicating a road network in a lane coordinate system, the lane coordinate system including a set of lane segments corresponding to one or more roads of the road network; in 1420, determining a data set for each respective lane segment of the set of lane segments, the data set indicating a lane segment network having one or more lane segment connections between the respective lane segment and each of a plurality of other lane segments of the set of lane segments; in 1430, assigning a data-set-denomination tag to the data set, the data-set-denomination tag indicating the lane segment corresponding to the data set; and, in 1440, storing the data set and the data-set-denomination tag assigned thereto.

According to various aspects, method 1300 and/or method 1400 may be performed independently of any information about a position of an ego-vehicle. Illustratively, the data sets may be created and stored at a first time, and at a second time, later than the first time, the data sets may be used. The use of the data sets may include determining a lane segment in which an ego-vehicle is located and retrieving the data set corresponding to this lane segment. Based on the one or more connecting routes indicated by the data set, one or more routes between one or more obstacles and the ego-vehicle may be determined.

Figure 15:
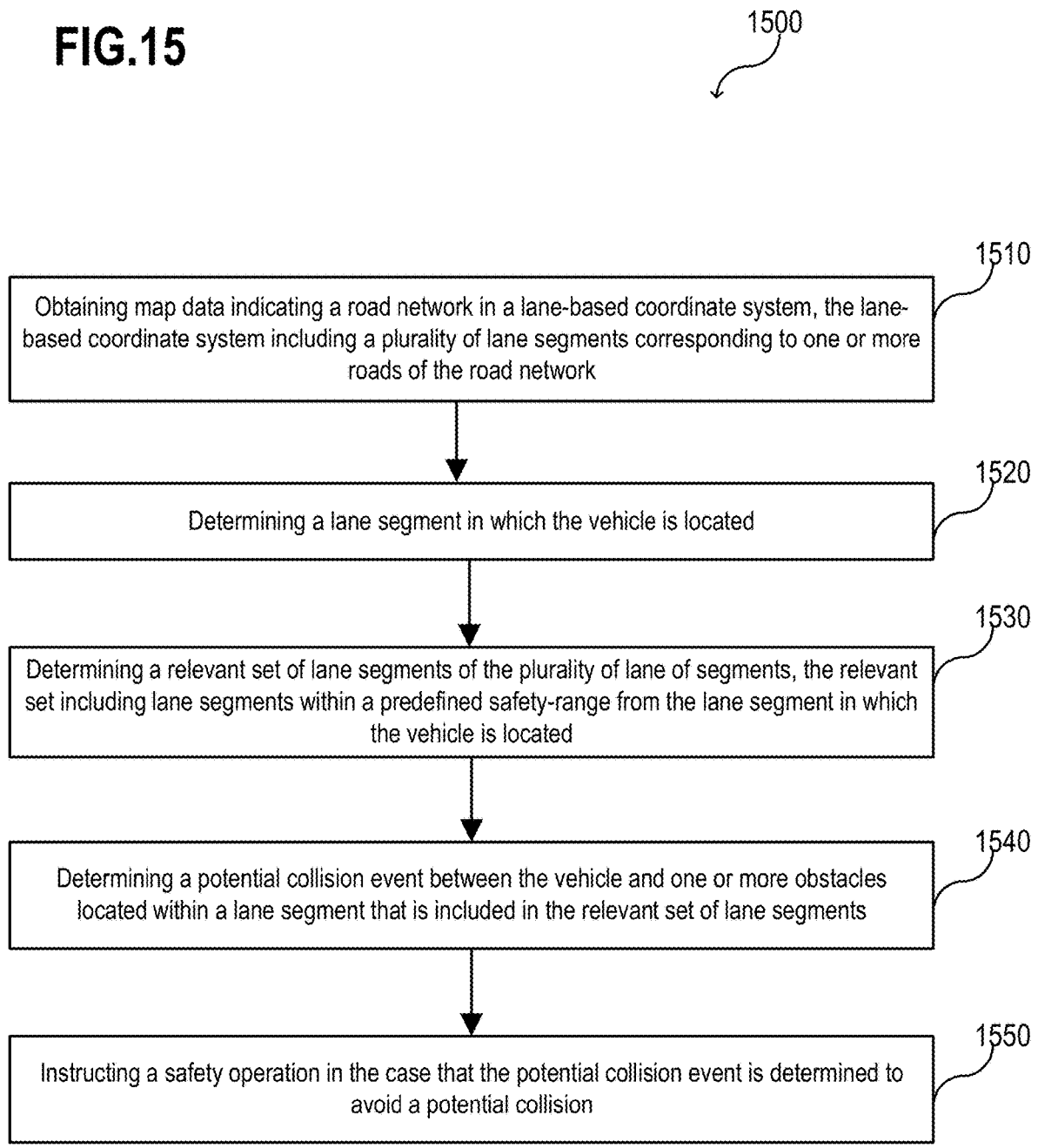

FIG. 15 shows a schematic flow diagram of a method 1500, according to various aspects. In some aspects, the method 1500 may include determining a potential collision event between a vehicle and one or more obstacles for each of the one or more obstacles that are located within one or more lane segments that are included in a relevant set of lane segments. The relevant set of lane segments may be determined based on a safety-range associated with the vehicle. The method 1500 may include, in 1510, obtaining map data indicating a road network in a lane-based coordinate system, the lane-based coordinate system including a plurality of lane segments corresponding to one or more roads of the road network; in 1520, determining a current lane segment in which the vehicle is located; in 1530, determining a relevant set of lane segments of the plurality of lane of segments, the relevant set including lane segments within a predefined safety-range from the current lane segment in which the vehicle is located; in 1540, determining a potential collision event between the vehicle and one or more obstacles located within a lane segment that is included in the relevant set of lane segments; and, in 1550, instructing a safety operation in the case that the potential collision event is determined to avoid a potential collision.

According to various aspects, the relevant set of lane segments may be a subset of a set of lane segments included in a lane-based coordinate system or in a lane-based map.

In the following, various examples are provided that are related to the aspects described above and illustrated in the figures.

Example 1 is a safety system (e.g., for use with a vehicle), the safety system including one or more processors configured to: receive vehicle position data indicating a position of the vehicle, determine a first lane segment in a lane coordinate system based on the vehicle position data, the first lane segment being a lane segment in which the vehicle is located, determine a relevant set of lane segments for the vehicle based on a safety-range from the first lane segment, obtain (e.g., determine or receive) obstacle position data indicating a second lane segment in the lane coordinate system, the second lane segment being a lane segment in which an obstacle is located, and classify the obstacle either as a non-relevant obstacle in the case that the second lane segment is not included in the relevant set of lane segments for the vehicle, or as a relevant obstacle in the case that the second lane segment is included in the relevant set of lane segments for the vehicle. According to various aspects, the one or more processors configured accordingly may be included—instead of in a safety system—in any other one or more devices.

In Example 2, the safety system of Example 1 may optionally include that the one or more processors are further configured to determine a potential collision event between the vehicle and the obstacle in the event the object is classified as the relevant obstacle.

In Example 3, the safety system of Example 1 or 2 may optionally include that the one or more processors are further configured to: determine a potential collision event between the vehicle and a further obstacle classified as the relevant obstacle, and discard the obstacle from the determination of the potential collision event in the event the obstacle is classified as the non-relevant obstacle.

In Example 4, the safety system of any one of Examples 1 to 3 may optionally include that the one or more processors are further configured to: determine whether a safety operation can avoid the potential collision, and instruct the safety operation (e.g., to a control system of the vehicle) in the case that the safety operation is determined to avoid the potential collision.

In Example 5, the safety system of any one of Examples 1 to 4 may optionally further include: one or more memories configured to store a plurality of data sets for a plurality of lane segments in the lane coordinate system. Each data set of the plurality of data sets may indicate a relevant set of lane segments for a respective lane segment of the plurality of lane segments.

In Example 6, the safety system of Example 5 may optionally include that the one or more processors are configured to determine the relevant set of lane segments for the vehicle by retrieving the data set that corresponds to the first lane segment from the one or more memories.

In Example 7, the safety system of Example 5 or 6 may optionally include that the each data set of the plurality of data sets has a respective denomination tag assigned thereto. Each denomination tag of the plurality of denomination tags may indicate a respective lane segment of the plurality lane segments.

In Example 8, the safety system of Example 7 may optionally include that the one or more processors are configured to determine the relevant set of lane segments for the vehicle by determining a denomination tag of the plurality of denomination tags that indicates the first lane segment, and retrieving a data set from the plurality of data sets that has the denomination tag indicating the first lane segment.

In Example 9, the safety system of Example 7 or 8 may optionally include that each data set of the plurality of data sets includes a relevant set of denomination tags, and that denomination tags of the relevant set of denomination tags respectively indicate lane segments of the relevant set of lane segments.

In Example 10, the safety system of Example 9 may optionally include that the one or more processors are configured to classify the obstacle by: determining the denomination tag of the plurality of denomination tags that indicates the first lane segment, and classifying the obstacle as the relevant obstacle in the case that the denomination tag of the plurality of denomination tags that indicates the first lane segment is equal to a denomination tag of the relevant set of denomination tags.

In Example 11, the safety system of Example 9 or 10 may optionally include that the one or more processors are configured to classify the obstacle by: determining the denomination tag of the plurality of denomination tags that indicates the first lane segment, and classifying the obstacle as the non-relevant obstacle in the case that the denomination tag of the plurality of denomination tags that indicates the first lane segment is not equal to any denomination tag of the relevant set of denomination tags.

In Example 12, the safety system of any one of Examples 5 to 11 may optionally include that the data set that corresponds to the first lane segment indicates one or more connecting routes connecting the first lane segment and each respective lane segment of the relevant set of lane segments for the vehicle.

In Example 13, the safety system of Example 12 may optionally include that the one or more processors are further configured to determine a potential collision event between the vehicle and the obstacle based on determining a connecting route between the first lane segment and the second lane segment based on the one or more connecting routes indicated by the data set.

In Example 14, the safety system of any one of Examples 1 to 13 may optionally include that the one or more processors are configured to determine the potential collision event between the vehicle and the obstacle in the event the obstacle is classified as the relevant obstacle, based on determining each lane segment of a plurality of lane segments in the lane coordinate system between the vehicle and the obstacle at least in a longitudinal direction of the lane coordinate system.

In Example 15, the safety system of any one of Examples 1 to 14 may optionally include that the one or more processors are configured to determine the potential collision event via a model-based approach in the case that a minimal distance between the vehicle and the obstacle is less than or equal to a minimal safety distance.

In Example 16, the safety system of any one of Examples 1 to 15 may optionally include that the obstacle is one of the following: a traffic infrastructure, a part of the traffic infrastructure, a pedestrian, or a further vehicle.

In Example 17, the safety system of any one of Examples 1 to 16 may optionally include that the safety-range is defined by a predefined maximal velocity associated with at least one lane segment of the relevant set of lane segments for the vehicle.

In Example 18, the safety system of Example 17 may optionally include that the predefined maximal velocity is defined by a speed limit associated with the at least one lane segment of the relevant set of lane segments for the vehicle.

In Example 19, the safety system of Example 17 may optionally include that predefined maximal velocity is defined by a speed limit associated with the at least one lane segment of the relevant set of lane segments for the vehicle and a margin of error assigned to the speed limit.

In Example 20, the safety system of any one of Examples 1 to 19 may optionally include that the one or more processors are further configured to: determine whether the obstacle is within a distance from the vehicle that is greater than a pre-defined distance, determine a potential collision event between the vehicle and a further obstacle classified as the relevant obstacle, and discard the obstacle from the determination of the potential collision event for a predefined time in the case that the distance from the vehicle is greater than the pre-defined distance.

In Example 21, the safety system of any one of Examples 1 to 20 may optionally include that the one or more processors are further configured to: determine whether the obstacle is within a distance from the vehicle that is within a predefined range, the predefined range beginning and ending farther from the vehicle than a safety-distance, and classify the obstacle as the non-relevant obstacle for a predefined time in the case that the obstacle is within the predefined range.

In Example 22, the safety system of any one of Examples 1 to 21 may optionally include that the one or more processors are further configured to: determine whether a non-classified obstacle is farther from the vehicle than the obstacle in the event the obstacle is classified as the non-relevant obstacle, determine a potential collision event between the vehicle and a further obstacle classified as the relevant obstacle, and discard the non-classified obstacle from the determination of the potential collision event for a predefined time in the case that the non-classified obstacle is farther from the vehicle than the obstacle.

In Example 23, the safety system of any one of Examples 1 to 22 may optionally include that the one or more processors are further configured to determine whether a non-classified obstacle is farther from the vehicle than the obstacle in the event the obstacle is classified as the non-relevant obstacle, and classify the non-classified obstacle as the non-relevant obstacle for a predefined time in the case that the non-classified obstacle is farther from the vehicle than the obstacle.

In Example 24, the safety system of any one of Examples 1 to 23 may optionally include that the data set includes at least one additional relevant set of lane segments for the vehicle, wherein the at least one additional relevant set of lane segments for the vehicle is related to the first lane segment, wherein the at least one additional relevant set of lane segments for the vehicle is defined by at least one additional safety-range from the first lane segment, and wherein the at least one additional safety-range is different from the safety-range.

In Example 25, the safety system of Example 24 may optionally include that a number of lane segments in the additional relevant set of lane segments for the vehicle is different from a number of lane segments in the relevant set of lane segments for the vehicle.

In Example 26, the safety system of Example 24 or 25 may optionally include that the one or more processors are further configured to receive information indicating whether the classification of the obstacle is to be performed based on the relevant set of lane segments for the vehicle or based on the at least one additional relevant set of lane segments for the vehicle.

Example 27 is an automated driving system, including: a sensing module configured to generate world model data; a planning module configured to generate control information based on the world model data; an acting module configured to transform the control information into one or more control commands; and a safety system of any one of Examples 1 to 26 configured to instruct the acting module to perform a safety operation.

In Example 28, the automated driving system of Example 27 may optionally include that the sensing module is further configured to determine the safety-range from the world model data.

Example 29 is a safety system, including one or more processors configured to: obtain (e.g., determine or receive) lane segment data, the lane segment data indicating a set of lane segments in a lane coordinate system, the set of lane segments corresponding to one or more roads, determine a data set for a respective lane segment of the set of lane segments, the data set indicating one or more connecting routes between the respective lane segment and one or more other lane segments of the set of lane segments, assign a data-set-denomination tag to the data set, the data-set-denomination indicating the respective lane segment corresponding to the data set, and store the data set and the data-set-denomination tag.

In Example 30, the safety system of Example 29 may optionally include that the set of lane segments includes or consists of each lane segment in the lane coordinate system that is within a safety-range from the respective lane segment.

In Example 31, the safety system of Example 30 may optionally include that each connecting route of the one or more connecting routes is a shortest connecting route between the respective lane segment and each lane segment of the one or more other lane segments. The shortest connecting route may be within the safety-range.

In Example 32, the safety system of any one of Examples 29 to 31 may optionally include that the data set includes a set of denomination tags. The denomination tags of the set of denomination tags may respectively indicate lane segments of the set of lane segments.

In Example 33, the safety system of any one of Examples 29 to 32 may optionally include that the one or more connecting routes connect the respective lane segment and each lane segment of the set of lane segments other than the respective lane segment.

In Example 34, the safety system of any one of Examples 29 to 33 may optionally include that the safety-range is defined by a predefined maximal velocity associated with at least one lane segment of the set of lane segments for the vehicle.

In Example 35, the safety system of Example 34 may optionally include that the predefined maximal velocity is defined by the speed limit associated with the at least one lane segment of the set of lane segments for the vehicle.

In Example 36, the safety system of Example 34 may optionally include that the predefined maximal velocity is defined by the speed limit associated with the at least one lane segment of the set of lane segments for the vehicle and a margin of error assigned to the speed limit.

Example 37 is a safety system, including one or more processors configured to: obtain (e.g., determine or receive) map data indicating a road network in a lane coordinate system, the lane coordinate system including a set of lane segments corresponding to one or more roads of the road network, determine a data set for each respective lane segment of the set of lane segments, each data set indicating a respective lane segment network having a respective lane segment connection between a respective lane segment of the set of lane segment and each lane segment other than the respective lane segment of the set of lane segments, assign a data-set-denomination tag to each data set of the set of data sets, each data-set-denomination tag of the set of data-set-denomination tags indicating the respective lane segment of the set of lane segment corresponding to a respective data set of the set of data sets, and store the set of data sets and the set of data-set-denomination tags.

Example 38 is a safety system (e.g. for a vehicle), the safety system including one or more processors configured to: obtain (e.g., determine or receive) map data indicating a road network in a lane-based coordinate system, the lane-based coordinate system including a plurality of lane segments corresponding to one or more roads of the road network, determine a lane segment in which the vehicle is located, determine a relevant set of lane segments of the plurality of lane of segments, the relevant set including lane segments within a predefined safety-range from the lane segment in which the vehicle is located, determine a potential collision event between the vehicle and one or more obstacles located within a lane segment that is included in the relevant set of lane segments, and instruct a safety operation in the case that the potential collision event is determined to avoid a potential collision.

In Example 39, the safety system of Example 38 may optionally include that the one or more processors are further configured to discard one or more obstacles located in a lane segment that is not included in the relevant set of lane segments from the determination of the potential collision event.

In Example 40, the safety system of Example 30 may optionally include that the one or more processors are further configured to dynamically update the safety-range based on a control message.

Example 41 is a method (e.g., a safety method), the method including: receiving vehicle position data indicating a position of the vehicle, determining a first lane segment in a lane coordinate system based on the vehicle position data, the first lane segment being a lane segment in which the vehicle is located, determining a relevant set of lane segments for the vehicle based on a safety-range from the first lane segment, obtain (e.g., determine or receive) obstacle position data indicating a second lane segment in the lane coordinate system, the second lane segment being a lane segment in which an obstacle is located, and classifying the obstacle either as a non-relevant obstacle in the case that the second lane segment is not included in the relevant set of lane segments for the vehicle, or as a relevant obstacle in the case that the second lane segment is included in the relevant set of lane segments for the vehicle.

In Example 42, the method of Example 41 may optionally include determining a potential collision event between the vehicle and the obstacle in the event the object is classified as the relevant obstacle.

In Example 43, the method of Example 41 or 42 may optionally include determining a potential collision event between the vehicle and a further obstacle classified as the relevant obstacle, and discarding the obstacle from the determination of the potential collision event in the event the obstacle is classified as the non-relevant obstacle.

In Example 44, the method of any one of Examples 41 to 43 may optionally include determining whether a safety operation can avoid the potential collision, and instructing the safety operation in the case that the safety operation is determined to avoid the potential collision.

In Example 45, the method of any one of Examples 41 to 44 may optionally further include: storing a plurality of data sets for a plurality of lane segments in the lane coordinate system (e.g., in memory). Each data set of the plurality of data sets may indicate a relevant set of lane segments for a respective lane segment of the plurality of lane segments.

In Example 46, the method of Example 45 may optionally include determining the relevant set of lane segments for the vehicle by retrieving the data set that corresponds to the first lane segment from the one or more memories.

In Example 47, the method of Example 45 or 46 may optionally include that the each data set of the plurality of data sets has a respective denomination tag assigned thereto. Each denomination tag of the plurality of denomination tags may indicate a respective lane segment of the plurality lane segments.

In Example 48, the method of Example 47 may optionally include determining the relevant set of lane segments for the vehicle by determining a denomination tag of the plurality of denomination tags that indicates the first lane segment, and retrieving a data set from the plurality of data sets that has the denomination tag indicating the first lane segment.

In Example 49, the method of Example 47 or 48 may optionally include that each data set of the plurality of data sets includes a relevant set of denomination tags, and that denomination tags of the relevant set of denomination tags respectively indicate lane segments of the relevant set of lane segments.

In Example 50, the method of Example 49 may optionally include that classifying the obstacle by: determining the denomination tag of the plurality of denomination tags that indicates the first lane segment, and classifying the obstacle as the relevant obstacle in the case that the denomination tag of the plurality of denomination tags that indicates the first lane segment is equal to a denomination tag of the relevant set of denomination tags.

In Example 51, the method of Example 49 or 50 may optionally include classifying the obstacle by: determining the denomination tag of the plurality of denomination tags that indicates the first lane segment, and classifying the obstacle as the non-relevant obstacle in the case that the denomination tag of the plurality of denomination tags that indicates the first lane segment is not equal to any denomination tag of the relevant set of denomination tags.

In Example 52, the method of any one of Examples 45 to 51 may optionally include that the data set that corresponds to the first lane segment indicates one or more connecting routes connecting the first lane segment and each respective lane segment of the relevant set of lane segments for the vehicle.

In Example 53, the method of Example 52 may optionally include determining a potential collision event between the vehicle and the obstacle based on determining a connecting route between the first lane segment and the second lane segment based on the one or more connecting routes indicated by the data set.

In Example 54, the method of any one of Examples 41 to 53 may optionally include determining the potential collision event between the vehicle and the obstacle, in the event the obstacle is classified as the relevant obstacle, based on determining each lane segment of a plurality of lane segments in the lane coordinate system between the vehicle and the obstacle at least in a longitudinal direction of the lane coordinate system.

In Example 55, the method of any one of Examples 41 to 54 may optionally include determining the potential collision event via a model-based approach in the case that a minimal distance between the vehicle and the obstacle is less than or equal to a minimal safety distance.

In Example 56, the method of any one of Examples 41 to 55 may optionally include that the obstacle is one of the following: a traffic infrastructure, a part of the traffic infrastructure, a pedestrian, or a further vehicle.

In Example 57, the method of any one of Examples 41 to 56 may optionally include that the safety-range is defined by a predefined maximal velocity associated with at least one lane segment of the relevant set of lane segments for the vehicle.

In Example 58, the method of Example 57 may optionally include that the predefined maximal velocity is defined by a speed limit associated with the at least one lane segment of the relevant set of lane segments for the vehicle.

In Example 59, the method of Example 57 may optionally include that predefined maximal velocity is defined by a speed limit associated with the at least one lane segment of the relevant set of lane segments for the vehicle and a margin of error assigned to the speed limit.

In Example 60, the method of any one of Examples 41 to 59 may optionally include: determining whether the obstacle is within a distance from the vehicle that is greater than a pre-defined distance, determining a potential collision event between the vehicle and a further obstacle classified as the relevant obstacle, and discarding the obstacle from the determination of the potential collision event for a pre-defined time in the case that the distance from the vehicle is greater than the pre-defined distance.

In Example 61, the method of any one of Examples 41 to 60 may optionally include: determining whether the obstacle is within a distance from the vehicle that is within a predefined range, the predefined range beginning and ending farther from the vehicle than a safety-distance, and classifying the obstacle as the non-relevant obstacle for a pre-defined time in the case that the obstacle is within the predefined range.

In Example 62, the method of any one of Examples 41 to 61 may optionally include: determine whether a non-classified obstacle is farther from the vehicle than the obstacle in the event the obstacle is classified as the non-relevant obstacle, determining a potential collision event between the vehicle and a further obstacle classified as the relevant obstacle, and discarding the non-classified obstacle from the determination of the potential collision event for a pre-defined time in the case that the non-classified obstacle is farther from the vehicle than the obstacle.

In Example 63, the method of any one of Examples 41 to 62 may optionally include determining whether a non-classified obstacle is farther from the vehicle than the obstacle in the event the obstacle is classified as the non-relevant obstacle, and classifying the non-classified obstacle as the non-relevant obstacle for a predefined time in the case that the non-classified obstacle is farther from the vehicle than the obstacle.

In Example 64, the method of any one of Examples 41 to 63 may optionally include that the data set includes at least one additional relevant set of lane segments for the vehicle, wherein the at least one additional relevant set of lane segments for the vehicle is related to the first lane segment, wherein the at least one additional relevant set of lane segments for the vehicle is defined by at least one additional safety-range from the first lane segment, and wherein the at least one additional safety-range is different from the safety-range.

In Example 65, the method of Example 64 may optionally include that a number of lane segments in the additional relevant set of lane segments for the vehicle is different from a number of lane segments in the relevant set of lane segments for the vehicle.

In Example 66, the method of Example 64 or 65 may optionally include receiving information indicating whether the classification of the obstacle is to be performed based on the relevant set of lane segments for the vehicle or based on the at least one additional relevant set of lane segments for the vehicle.

Example 67 is a method (e.g., for operating an automated driving system), the method including: generating world model data; generating control information based on the world model data; transforming the control information into one or more control commands; and a method of any one of Examples 41 to 66 to instruct a safety operation.

In Example 68, the method of Example 67 may optionally include determining the safety-range from the world model data.

Example 69 is a method (e.g., a safety method), the method including: obtaining (e.g., determining or receiving) lane segment data, the lane segment data indicating a set of lane segments in a lane coordinate system, the set of lane segments corresponding to one or more roads, determining a data set for a respective lane segment of the set of lane segments, the data set indicating one or more connecting routes between the respective lane segment and one or more other lane segments of the set of lane segments, assigning a data-set-denomination tag to the data set, the data-set-denomination indicating the respective lane segment corresponding to the data set, and storing the data set and the data-set-denomination tag (e.g., in memory).

In Example 70, the method of Example 69 may optionally include that the set of lane segments includes or consists of each lane segment in the lane coordinate system that is within a safety-range from the respective lane segment.

In Example 71, the method of Example 70 may optionally include that each connecting route of the one or more connecting routes is a shortest connecting route between the respective lane segment and each lane segment of the one or more other lane segments. The shortest connecting route may be within the safety-range.

In Example 72, the method of any one of Examples 69 to 71 may optionally include that the data set includes a set of denomination tags. The denomination tags of the set of denomination tags may respectively indicate lane segments of the set of lane segments.

In Example 73, the method of any one of Examples 69 to 72 may optionally include that the one or more connecting routes connect the respective lane segment and each lane segment of the set of lane segments other than the respective lane segment.

In Example 74, the method of any one of Examples 69 to 73 may optionally include that the safety-range is defined by a predefined maximal velocity associated with at least one lane segment of the set of lane segments for the vehicle.

In Example 75, the method of Example 74 may optionally include that the predefined maximal velocity is defined by the speed limit associated with the at least one lane segment of the set of lane segments for the vehicle.

In Example 76, the method of Example 74 may optionally include that the predefined maximal velocity is defined by the speed limit associated with the at least one lane segment of the set of lane segments for the vehicle and a margin of error assigned to the speed limit.

Example 77 is a method (e.g., a safety method), the method including: obtaining (e.g., determining or receiving) map data indicating a road network in a lane coordinate system, the lane coordinate system including a set of lane segments corresponding to one or more roads of the road network, determining a data set for each respective lane segment of the set of lane segments, each data set indicating a respective lane segment network having a respective lane segment connection between a respective lane segment of the set of lane segment and each lane segment other than the respective lane segment of the set of lane segments, assigning a data-set-denomination tag to each data set of the set of data sets, each data-set-denomination tag of the set of data-set-denomination tags indicating the respective lane segment of the set of lane segment corresponding to a respective data set of the set of data sets, and storing the set of data sets and the set of data-set-denomination tags (e.g., in memory).

Example 78 is a method (e.g. a safety method for a vehicle), the safety method including: obtaining (e.g., determining or receiving) map data indicating a road network in a lane-based coordinate system, the lane-based coordinate system including a plurality of lane segments corresponding to one or more roads of the road network, determining a lane segment in which the vehicle is located, determining a relevant set of lane segments of the plurality of lane segments, the relevant set including lane segments within a predefined safety-range from the lane segment in which the vehicle is located, determining a potential collision event between the vehicle and one or more obstacles located within a lane segment that is included in the relevant set of lane segments, and instructing a safety operation in the case that the potential collision event is determined to avoid a potential collision.

In Example 79, the method of Example 78 may optionally include discarding one or more obstacles located in a lane segment that is not included in the relevant set of lane segments from the determination of the potential collision event.

In some aspects, any method described herein may be partially or completely implemented as a non-transitory machine readable medium storing one or more sequences of instructions, which when executed, cause one or more processors to perform at least a portion or all of the method. In some aspects, a non-transitory machine readable medium storing one or more sequences of instructions, which when executed, cause one or more processors to perform any one of Examples 41 to 79.

In some aspects, any method described herein may be implemented partially or completely via one or more means of an apparatus or of a system. As an example, an apparatus or a system may include one or more means to carry out one or more aspects of any one of Examples 1 to 79.

In some aspects, the safety system may be used in association with a vehicle to control a control system of the vehicle. The control system of the vehicle may include an automated driving system, an automated breaking system, an automated steering system, as examples. The safety system may be configured to instruct a control system of the vehicle to perform a safety operation, e.g., to perform an emergency breaking operation.

According to various aspects, a vehicle may include a safety system (e.g., the safety system of any one of Examples 1 to 40) and a control system (e.g., an automated driving system, an automated breaking system, an automated steering system, among others). In some aspects, the safety system may be configured to check for a potential collision event and to instruct the control system of the vehicle to perform a safety operation in case that a potential collision event is determined. The vehicle may further include one or more sensors to determine vehicle position data indicating a position of the vehicle.

Example 80 is a vehicle including a safety system according to any one of Examples 1 to 40; and a control system configured to perform a safety operation.

In Example 81, the vehicle of Example 80 may further include one or more sensors configured to determine the vehicle position data indicating the position of the vehicle.

In Example 82, the vehicle of Example 80 or 81 may further include that the one or more processors of the safety system are further configured to: determine a potential collision event between the vehicle and a further obstacle classified as the relevant obstacle, determine whether a safety operation can avoid the potential collision, and instruct the safety operation to the control system of the vehicle in the case that the safety operation is determined to avoid the potential collision.

In Example 83, the vehicle of Example 82 may further include that the one or more processors of the safety system are further configured to discard the obstacle from the determination of the potential collision event in the event the obstacle is classified as the non-relevant obstacle.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A safety system for use with a vehicle, the safety system comprising:
one or more processors configured to:
receive vehicle position data indicating a position of the vehicle,
determine a first lane segment in a lane coordinate system based on the vehicle position data, the first lane segment being a lane segment in which the vehicle is located, wherein the lane coordinate system is a lane-based coordinate system, in which each road is described by a plurality of lane segments laterally to the vehicle and a plurality of lane segments longitudinally to the vehicle,
determine a relevant set of lane segments of the lane coordinate system for the vehicle based on a safety-range from the first lane segment,
determine or receive obstacle position data indicating a second lane segment in the lane coordinate system, the second lane segment being a lane segment in which an obstacle is located, and
classify the obstacle either as a non-relevant obstacle in the case that the second lane segment is not included in the relevant set of lane segments for the vehicle, or as a relevant obstacle in the case that the second lane segment is included in the relevant set of lane segments for the vehicle;
determine a potential collision event between the vehicle and the relevant obstacle,
discard the obstacle from the determination of the potential collision event in the event the obstacle is classified as the non-relevant obstacle;
determine whether a safety operation can avoid the potential collision, and
instruct the safety operation to a control system of the vehicle in the case that the safety operation is determined to avoid the potential collision.

2. The safety system of claim 1,
wherein the one or more processors are further configured to determine a potential collision event between the vehicle and the obstacle in the event the object is classified as the relevant obstacle.

3. The safety system of claim 2,
wherein the one or more processors are configured to determine the potential collision event between the vehicle and the obstacle in the event the obstacle is classified as the relevant obstacle, based on determining each lane segment of a plurality of lane segments in the lane coordinate system between the vehicle and the obstacle at least in a longitudinal direction of the lane coordinate system.

4. The safety system of claim 2,
wherein the one or more processors are configured to determine the potential collision event via a model-based approach in the case that a minimal distance between the vehicle and the obstacle is less than or equal to a minimal safety distance.

5. The safety system of claim 1,
wherein the obstacle is a first obstacle;
wherein the one or more processors are further configured to:
determine a potential collision event between the vehicle and a second obstacle classified as relevant obstacle, and
discard the first obstacle from the determination of the potential collision event in the event that the first obstacle is classified as a non-relevant obstacle.

6. The safety system of claim 1, further comprising:
one or more memories configured to store a plurality of data sets for a plurality of lane segments in the lane coordinate system,
wherein each data set of the plurality of data sets indicates a relevant set of lane segments for a respective lane segment of the plurality of lane segments.

7. The safety system of claim 6,
wherein the one or more processors are configured to determine the relevant set of lane segments for the vehicle by retrieving the data set that corresponds to the first lane segment from the one or more memories.

8. The safety system of claim 5,
wherein the data set that corresponds to the first lane segment indicates at least two connecting routes of the vehicle connecting the first lane segment and each respective lane segment of the relevant set of lane segments for the vehicle.

9. The safety system of claim 8,
wherein the one or more processors are further configured to determine a potential collision event between the vehicle and the obstacle based on determining a connecting route between the first lane segment and the second lane segment based on the one or more connecting routes indicated by the data set.

10. The safety system of claim 6,
wherein the data set comprises at least one additional relevant set of lane segments for the vehicle,
wherein the at least one additional relevant set of lane segments for the vehicle is related to the first lane segment,
wherein the at least one additional relevant set of lane segments for the vehicle is defined by at least one additional safety-range from the first lane segment, and
wherein the at least one additional safety-range is different from the safety-range.

11. The safety system of claim 10,
wherein a number of lane segments in the additional relevant set of lane segments for the vehicle is different from a number of lane segments in the relevant set of lane segments for the vehicle.

12. The safety system of claim 6, wherein the data set that corresponds to the first lane segment comprises a second lane segment that is adjacent to the first lane segment, and wherein the data set further comprises a third lane segment, different from the second lane segment, that is adjacent to the first lane segment.

13. The safety system of claim 12, wherein the data set that corresponds to the first lane segment further comprises a fourth lane segment, different from the second lane segment and the third lane segment, that is adjacent to the first lane segment.

14. The safety system of claim 1,
wherein the safety-range is defined by a predefined maximal velocity associated with at least one lane segment of the relevant set of lane segments for the vehicle, and
wherein the predefined maximal velocity is defined by a speed limit associated with the at least one lane segment of the relevant set of lane segments for the vehicle.

15. The safety system of claim 1,
wherein the obstacle is a first obstacle;
wherein the one or more processors are further configured to:
  determine whether the first obstacle is within a distance from the vehicle that is greater than a pre-defined distance,
  determine a potential collision event between the vehicle and a second obstacle classified as a relevant obstacle, and
  discard the first obstacle from the determination of the potential collision event for a predefined time in the case that the distance from the vehicle is greater than the pre-defined distance.

16. The safety system of claim 1,
wherein the one or more processors are further configured to:
  determine whether the obstacle is within a distance from the vehicle that is within a predefined range, the predefined range beginning and ending farther from the vehicle than a safety-distance, and
  classify the obstacle as a non-relevant obstacle for a predefined time in the case that the obstacle is within the predefined range.

17. The safety system of claim 1,
wherein the obstacle is a first obstacle;
wherein the one or more processors are further configured to:
  determine whether a non-classified obstacle is farther from the vehicle than the first obstacle in the event the first obstacle is classified as a non-relevant obstacle,
  determine a potential collision event between the vehicle and a second obstacle classified as a relevant obstacle, and
  discard the non-classified obstacle from the determination of the potential collision event for a predefined time in the case that the non-classified obstacle is farther from the vehicle than the first obstacle.

18. The safety system of claim 1,
wherein the obstacle is a first obstacle;
wherein the one or more processors are further configured to
  determine whether a non-classified obstacle is farther from the vehicle than the first obstacle in the event the first obstacle is classified as a non-relevant obstacle, and
  classify the non-classified obstacle as a non-relevant obstacle for a predefined time in the case that the non-classified obstacle is farther from the vehicle than the first obstacle.

19. A vehicle, comprising:
the safety system of claim 1; and
a control system configured to perform a safety operation.

20. The vehicle of claim 19, further comprising:
one or more sensors configured to determine the vehicle position data indicating the position of the vehicle.

21. The vehicle of claim 19,
wherein the one or more processors of the safety system are further configured to:
determine a potential collision event between the vehicle and a further obstacle classified as the relevant obstacle,
determine whether a safety operation can avoid the potential collision, and instruct the safety operation to the control system of the vehicle in the case that the safety operation is determined to avoid the potential collision.

* * * * *